US012385196B2

(12) United States Patent
Selevan et al.

(10) Patent No.: US 12,385,196 B2
(45) Date of Patent: Aug. 12, 2025

(54) NETWORKABLE DEVICES FOR INTERNAL ILLUMINATION OF TRAFFIC CONES AND OTHER TRAFFIC CHANNELIZING DEVICES

(71) Applicants: Daniel Joseph Selevan, Laguna Beach, CA (US); Adam Jordan Selevan, Laguna Beach, CA (US); James R. Selevan, Laguna Beach, CA (US)

(72) Inventors: Daniel Joseph Selevan, Laguna Beach, CA (US); Adam Jordan Selevan, Laguna Beach, CA (US); James R. Selevan, Laguna Beach, CA (US)

( * ) Notice: Subject to any disclaimer, the term of this patent is extended or adjusted under 35 U.S.C. 154(b) by 0 days.

(21) Appl. No.: 18/108,465

(22) Filed: Feb. 10, 2023

(65) Prior Publication Data

US 2023/0340738 A1 Oct. 26, 2023

Related U.S. Application Data

(60) Provisional application No. 63/309,426, filed on Feb. 11, 2022.

(51) Int. Cl.
*E01F 9/654* (2016.01)
*E01F 9/615* (2016.01)
*G08G 1/0967* (2006.01)

(52) U.S. Cl.
CPC .............. *E01F 9/654* (2016.02); *E01F 9/615* (2016.02); *G08G 1/096766* (2013.01)

(58) Field of Classification Search
CPC ..... E01F 9/654; E01F 9/615; G08G 1/096766
See application file for complete search history.

(56) References Cited

U.S. PATENT DOCUMENTS

| | | | |
|---|---|---|---|
| 3,500,378 | A | 3/1970 | Pickering et al. |
| 3,787,867 | A | 1/1974 | Dodge et al. |
| 3,846,672 | A | 11/1974 | Doughty |
| 4,132,983 | A | 1/1979 | Shapiro |
| 4,249,159 | A | 2/1981 | Stasko |
| 4,345,305 | A | 8/1982 | Kolm et al. |
| 4,827,245 | A | 5/1989 | Lipman |
| 4,841,278 | A | 6/1989 | Tezuka et al. |
| 5,294,924 | A | 3/1994 | Dydzyk |
| 5,345,232 | A | 9/1994 | Robertson |
| 5,428,546 | A | 6/1995 | Shah et al. |

(Continued)

FOREIGN PATENT DOCUMENTS

| | | | |
|---|---|---|---|
| CN | 102147954 | A | 8/2011 |
| CN | 105812673 | A | 7/2016 |

(Continued)

OTHER PUBLICATIONS

Finley, M.D. et al., "Sequential Warning Light System for Work Zone Lane Closures," Texas Transportation System, (2011) pp. 1-23.

(Continued)

*Primary Examiner* — Mohamed Barakat
(74) *Attorney, Agent, or Firm* — Robert D. Buyan; Stout, Uxa & Buyan, LLP

(57) ABSTRACT

Devices, systems and methods for causing light (visible or invisible) or other forms of energy to be emitted from traffic cones or other traffic channelizing or marking devices such as barrels, tubes, some buoys, some types of signs, etc.

18 Claims, 15 Drawing Sheets

(56) References Cited

U.S. PATENT DOCUMENTS

| | | | | |
|---|---|---|---|---|
| 5,438,495 | A | 8/1995 | Ahlen et al. | |
| 5,551,370 | A | 9/1996 | Hwang | |
| 5,673,039 | A | 9/1997 | Pietzsch et al. | |
| 5,754,124 | A | 5/1998 | Daggett et al. | |
| 6,299,379 | B1 | 10/2001 | Lewis | |
| 6,332,077 | B1 | 12/2001 | Wu et al. | |
| 6,486,797 | B1 | 11/2002 | Laidman | |
| 6,549,121 | B2 | 4/2003 | Povey et al. | |
| 6,614,358 | B1 | 9/2003 | Hutchison et al. | |
| D498,164 | S | 11/2004 | Delich | |
| 6,929,378 | B2 | 8/2005 | Wang | |
| D510,289 | S | 10/2005 | Dueker et al. | |
| 6,963,275 | B2 | 11/2005 | Smalls | |
| D515,957 | S | 2/2006 | Dueker et al. | |
| D515,958 | S | 2/2006 | Dueker et al. | |
| 7,088,222 | B1 * | 8/2006 | Dueker | F21L 4/08 362/153.1 |
| 7,106,179 | B1 | 9/2006 | Dueker et al. | |
| 7,182,479 | B1 | 2/2007 | Flood et al. | |
| 7,230,546 | B1 | 6/2007 | Nelson et al. | |
| 7,277,809 | B1 | 10/2007 | DeWitt, Jr. et al. | |
| 7,298,244 | B1 | 11/2007 | Cress et al. | |
| 7,301,469 | B1 | 11/2007 | Hoffman et al. | |
| D560,533 | S | 1/2008 | Dueker et al. | |
| D564,387 | S | 3/2008 | Rubin et al. | |
| 7,455,419 | B2 | 11/2008 | Helget et al. | |
| 7,563,158 | B2 | 7/2009 | Haschke et al. | |
| D631,582 | S | 1/2011 | Hwang | |
| 8,072,345 | B2 | 12/2011 | Gallo | |
| D654,387 | S | 2/2012 | Wilson et al. | |
| 8,154,424 | B2 | 4/2012 | Selevan | |
| 8,220,950 | B1 | 7/2012 | Sunshine | |
| D669,805 | S | 10/2012 | Edwards et al. | |
| D678,100 | S | 3/2013 | Hwang | |
| 8,550,653 | B2 | 10/2013 | Wilson et al. | |
| 8,564,456 | B2 | 10/2013 | Selevan | |
| 8,579,460 | B2 | 11/2013 | Wilson et al. | |
| 8,602,584 | B2 | 12/2013 | Ghafoori et al. | |
| 8,643,511 | B1 | 2/2014 | Batterson | |
| 8,672,517 | B2 | 3/2014 | Chung et al. | |
| 8,770,774 | B2 | 7/2014 | Ye et al. | |
| 8,786,461 | B1 | 7/2014 | Daudelin | |
| 8,949,022 | B1 | 2/2015 | Fahrner et al. | |
| 9,066,383 | B2 | 6/2015 | Gerszberg | |
| 9,288,088 | B1 | 3/2016 | McIlroy | |
| 9,437,109 | B1 | 9/2016 | Stafford et al. | |
| 9,489,809 | B1 | 11/2016 | Dever et al. | |
| D778,752 | S | 2/2017 | Selevan | |
| D778,753 | S | 2/2017 | Selevan | |
| 9,835,319 | B2 | 12/2017 | Selevan et al. | |
| 10,066,808 | B2 | 9/2018 | Fernando | |
| 10,443,828 | B2 | 10/2019 | Selevan et al. | |
| 2002/0006313 | A1 | 1/2002 | Pas | |
| 2002/0008637 | A1 | 1/2002 | Lemelson et al. | |
| 2002/0036908 | A1 | 3/2002 | Pederson | |
| 2002/0067290 | A1 | 6/2002 | Peet, II et al. | |
| 2002/0115423 | A1 | 8/2002 | Hatae et al. | |
| 2002/0154787 | A1 | 10/2002 | Rice et al. | |
| 2002/0159251 | A1 * | 10/2002 | Hart | F21S 9/037 362/311.06 |
| 2002/0175831 | A1 | 11/2002 | Bergan et al. | |
| 2003/0164666 | A1 | 9/2003 | Crunk | |
| 2004/0056779 | A1 | 3/2004 | Rast | |
| 2004/0100396 | A1 | 5/2004 | Antico et al. | |
| 2004/0113817 | A1 | 6/2004 | Novak et al. | |
| 2004/0124993 | A1 | 7/2004 | George | |
| 2004/0183694 | A1 | 9/2004 | Bauer | |
| 2004/0263330 | A1 | 12/2004 | Alarcon | |
| 2004/0264440 | A1 | 12/2004 | Wan et al. | |
| 2005/0040970 | A1 | 2/2005 | Hutchins et al. | |
| 2005/0134478 | A1 | 6/2005 | Mese et al. | |
| 2005/0210722 | A1 | 9/2005 | Graef et al. | |
| 2005/0248299 | A1 | 11/2005 | Chemel et al. | |
| 2005/0254246 | A1 | 11/2005 | Huang | |
| 2006/0072306 | A1 | 4/2006 | Woodyard | |
| 2006/0097882 | A1 | 5/2006 | Brinkerhoff et al. | |
| 2006/0104054 | A1 | 5/2006 | Coman | |
| 2006/0165025 | A1 | 7/2006 | Singh et al. | |
| 2007/0038743 | A1 | 2/2007 | Hellhake et al. | |
| 2007/0099625 | A1 | 5/2007 | Rosenfeld | |
| 2007/0115139 | A1 | 5/2007 | Witte et al. | |
| 2007/0153520 | A1 | 7/2007 | Curran et al. | |
| 2007/0155139 | A1 | 7/2007 | Hecht et al. | |
| 2007/0194906 | A1 | 8/2007 | Sink | |
| 2007/0222638 | A1 | 9/2007 | Chen et al. | |
| 2007/0222640 | A1 | 9/2007 | Guelzow et al. | |
| 2007/0250212 | A1 | 10/2007 | Halloran et al. | |
| 2007/0273509 | A1 | 11/2007 | Gananathan | |
| 2007/0273552 | A1 | 11/2007 | Tischer | |
| 2008/0037431 | A1 | 2/2008 | Werb et al. | |
| 2008/0042866 | A1 | 2/2008 | Morse et al. | |
| 2008/0091304 | A1 | 4/2008 | Ozick et al. | |
| 2008/0122607 | A1 | 5/2008 | Bradley | |
| 2008/0122656 | A1 | 5/2008 | Carani et al. | |
| 2008/0150758 | A1 | 6/2008 | Vallejo, Sr. | |
| 2008/0198038 | A1 | 8/2008 | Mngst et al. | |
| 2008/0242220 | A1 | 10/2008 | Wilson et al. | |
| 2008/0267259 | A1 | 10/2008 | Budampati et al. | |
| 2009/0009406 | A1 | 1/2009 | Chu et al. | |
| 2009/0034258 | A1 | 2/2009 | Tsai et al. | |
| 2009/0034419 | A1 | 2/2009 | Flammer et al. | |
| 2009/0063030 | A1 | 3/2009 | Howarter et al. | |
| 2009/0115336 | A1 | 5/2009 | Wang | |
| 2009/0174572 | A1 | 7/2009 | Smith | |
| 2009/0187300 | A1 | 7/2009 | Everitt | |
| 2009/0231159 | A1 * | 9/2009 | Selevan | G08G 1/095 340/907 |
| 2010/0109898 | A1 | 5/2010 | Kensy et al. | |
| 2010/0259199 | A1 | 10/2010 | McDermott | |
| 2011/0010094 | A1 | 1/2011 | Simon | |
| 2011/0249430 | A1 | 10/2011 | Stamatatos et al. | |
| 2011/0249688 | A1 | 10/2011 | Liu | |
| 2012/0051056 | A1 | 3/2012 | Derks et al. | |
| 2012/0139425 | A1 | 6/2012 | Kim | |
| 2012/0249341 | A1 | 10/2012 | Brown et al. | |
| 2012/0256765 | A1 | 10/2012 | Selevan | |
| 2012/0277934 | A1 | 11/2012 | Ohtomo et al. | |
| 2012/0287611 | A1 | 11/2012 | Wilson et al. | |
| 2013/0113634 | A1 | 5/2013 | Hutchinson et al. | |
| 2013/0114268 | A1 | 5/2013 | Shigematsu et al. | |
| 2013/0166193 | A1 | 6/2013 | Goldman et al. | |
| 2013/0214924 | A1 | 8/2013 | Ko | |
| 2013/0221852 | A1 | 8/2013 | Bowers et al. | |
| 2013/0260695 | A1 | 10/2013 | Wang | |
| 2013/0271294 | A1 | 10/2013 | Selevan | |
| 2013/0293396 | A1 | 11/2013 | Selevan | |
| 2014/0071681 | A1 * | 3/2014 | Ghafoori | H05B 47/155 362/249.14 |
| 2014/0126187 | A1 | 5/2014 | Bennett et al. | |
| 2014/0210373 | A1 | 7/2014 | Baret | |
| 2015/0009682 | A1 | 1/2015 | Clough | |
| 2015/0077234 | A1 | 3/2015 | Fullam | |
| 2015/0116991 | A1 * | 4/2015 | Miano | E01F 9/615 362/157 |
| 2015/0117010 | A1 | 4/2015 | Auen | |
| 2015/0330616 | A1 | 11/2015 | Preuschl et al. | |
| 2015/0338079 | A1 | 11/2015 | Preuschl et al. | |
| 2015/0366275 | A1 | 12/2015 | Cserfoi | |
| 2015/0369456 | A1 | 12/2015 | Creusen et al. | |
| 2016/0144778 | A1 | 5/2016 | Tucker | |
| 2016/0174099 | A1 | 6/2016 | Goldfain | |
| 2016/0186971 | A1 | 6/2016 | Selevan et al. | |
| 2016/0248506 | A1 | 8/2016 | Ryan et al. | |
| 2017/0097128 | A1 | 4/2017 | Stafford | |
| 2017/0151994 | A1 | 6/2017 | Braunberger | |
| 2017/0160392 | A1 | 6/2017 | Brisimitzakis et al. | |
| 2017/0287217 | A1 | 10/2017 | Kim et al. | |
| 2017/0354019 | A1 | 12/2017 | Julian et al. | |
| 2017/0355300 | A1 | 12/2017 | Kurata | |
| 2018/0079463 | A1 | 3/2018 | Pearce | |
| 2019/0018132 | A1 | 1/2019 | Decker et al. | |
| 2019/0113213 | A1 * | 4/2019 | Vartan | F21V 21/06 |

(56) References Cited

U.S. PATENT DOCUMENTS

| | | | | |
|---|---|---|---|---|
| 2019/0132709 | A1 | 5/2019 | Graefe et al. | |
| 2020/0096181 | A1* | 3/2020 | Selevan .................... | F21L 2/00 |
| 2021/0237777 | A1 | 8/2021 | Selevan et al. | |

FOREIGN PATENT DOCUMENTS

| | | | |
|---|---|---|---|
| DE | 102008011228 | A1 | 8/2009 |
| EP | 1531444 | A2 | 5/2005 |
| JP | 03-162279 | A | 7/1991 |
| JP | 06-024012 | U | 3/1994 |
| JP | 11260102 | A | 9/1999 |
| JP | 2005-019013 | A | 1/2005 |
| JP | 3108195 | U | 4/2005 |
| JP | 2005113636 | A | 4/2005 |
| JP | 2007501971 | A | 2/2007 |
| JP | 2010/157213 | A | 7/2010 |
| JP | 2010221874 | A | 10/2010 |
| JP | 2014130409 | A | 7/2014 |
| JP | 3208109 | U | 12/2016 |
| JP | 2017092652 | A | 5/2017 |
| TW | 201528878 | A | 7/2015 |
| WO | WO 98/21519 | A1 | 5/1998 |
| WO | WO 2003/026358 | A1 | 3/2003 |
| WO | WO2005/015520 | A1 | 2/2005 |
| WO | WO 2007/030852 | A1 | 3/2007 |
| WO | WO 2009/111184 | A2 | 9/2009 |
| WO | WO2012/002163 | A1 | 1/2012 |
| WO | WO2012/064951 | A2 | 5/2012 |
| WO | WO 2014/099953 | A1 | 6/2014 |
| WO | WO 2014/115541 | A1 | 7/2014 |
| WO | WO 2014/130842 | A1 | 8/2014 |
| WO | WO 2016/070193 | A1 | 5/2016 |
| WO | WO2016/077812 | A1 | 5/2016 |
| WO | WO2021/104031 | A1 | 6/2021 |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.
Internet Website Screen Capture, www.empco-lite.com; Sep. 6, 2010.
PCT International Search Report dated Apr. 27, 2018 in PCT Application No. PCT/US2018/017683.
International Search Report and Written Opinion dated May 28, 2014 in PCT Application US2014/017756. International Filing Date Feb. 21, 2014.
PCT International Search Report dated Mar. 18, 2016 in PCT Application No. PCT/US2015/060770.
PCT International Search Report dated Oct. 26, 2018 in related PCT Application No. PCT/US2018/041126.
Extended European Search Report dated Jun. 20, 2018 in related European Application No. 15858697.4.
Office Action Dated Oct. 23, 2019 in related Japanese Patent Application No. 2017-544855.
Non-Final Office Action Dated Mar. 17, 2011 in U.S. Appl. No. 12/381,565.
Non-Final Office Action Dated Nov. 8, 2012 in U.S. Appl. No. 13/440,930.
Non-Final Office Action Dated Oct. 8, 2014 in U.S. Appl. No. 13/774,029.
Non-Final Office Action Dated Aug. 11, 2014 in U.S. Appl. No. 13/775,177.
Final Office Action Dated May 8, 2015 in U.S. Appl. No. 13/774,029.
Final Office Action Dated Mar. 30, 2015 in U.S. Appl. No. 13/775,177.
Non-Final Office Action Dated Sep. 18, 2015 in U.S. Appl. No. 13/775,177.
Non-Final Office Action Dated Mar. 25, 2015 in U.S. Appl. No. 14/186,582.
Non-Final Office Action Dated Jan. 7, 2020 in U.S. Appl. No. 16/522,282.
Non-Final Office Action Dated Jan. 17, 2020 in U.S. Appl. No. 16/573,762.
Non-Final Office Action Dated Jan. 22, 2019 in U.S. Appl. No. 16/029,379.
Final Office Action Dated Sep. 5, 2019 in U.S. Appl. No. 16/029,379.
Non-Final Office Action Dated Nov. 30, 2016 in U.S. Appl. No. 15/177,192.
Non-Final Office Action Dated Apr. 19, 2017 in U.S. Appl. No. 14/941,646.
Non-Final Office Action Dated May 11, 2018 in U.S. Appl. No. 15/831,065.
Final Office Action Dated Dec. 27, 2018 in U.S. Appl. No. 15/831,065.
Final Office Action Dated Apr. 30, 2020 in U.S. Appl. No. 16/522,282.
Extended European Search Report dated Dec. 2, 2020 in related European Application No. 18751574.7.
Car 2 Car Communications Consortium: "Car 2 Car Communication Consortium Manifesto; Overview of the C2C-CC System, Version 1.1", Internet Citation, Aug. 2007, pp. 1-94, Retrieved from the Internet: URL:http://www.car-to-car.org/fileadmin/downloads/C2C-CC_manifesto.v1.1.pdf.
Jiang, Daniel et al., "Design of 5.9 ghz dsrc-based vehicular safety communication", IEEE Wireless Communications, Coordinated Science Laboratory; Dept. Electrical and Computer Engineering, University of Illinois at Urbana—Champaign, US, vol. 13, No. 5, Oct. 2006, pp. 36-43.
Caveney, Derek,"Cooperative Vehicular Safety Applications", IEEE Control Systems Magazine, IEEE Service Center, Piscataway, NJ, US, vol. 30, No. 4, Aug. 2010, pp. 38-53.
Boukerche, A. et al., "Vehicular Ad Hoc Networks: A New Challenge for Localization-Based Systems", Computer Communications, Elsevier Science Publishers, vol. 31, No. 12, Jul. 2008, pp. 2838-2849.
Rola Naja, "Wireless Vehicular Networks for Car Collision Avoidance", in "Wireless Vehicular Networks for Car Collision Avoidance", May 2013, Springer Verlag, retrieved from the Internet: URL:https://www.springer.com/de/book/9871441995629.
Extended European Search Report dated Mar. 2, 2021 in related European Application No. 18828265.1.
Office Action Dated Mar. 3, 2021 in corresponding Chinese Patent Application No. 201880057575.3.
PCT International Search Report dated Jul. 22, 2021 in PCT Application No. PCT/US2021/012872.
Office Action Dated Oct. 21, 2021 in corresponding European Patent Application No. 18751574.7.
Office Action Dated Oct. 11, 2021 in corresponding Chinese Patent Application No. 201880057575.3.
Office Action Dated Jan. 11, 2022 in related Japanese Patent Application No. 2019-543284.
Liu, Zhitian et al., "Efficient Single-Layer White Light-Emitting Devices Based on Silole-Containing Polymers," Journal of Display Technology, Mar. 2013.
Office Action Dated Feb. 7, 2023 in related Japanese Patent Application No. 2022-068386.
Office Action Dated May 9, 2023 in related Japanese Patent Application No. 2020-521857.
PCT International Search Report dated Apr. 26, 2023 in related PCT Application No. PCT/US2022/054158.
PCT International Search Report dated Jul. 14, 2023 in related PCT Application No. PCT/US2023/012840.

* cited by examiner

NETWORKABLE DEVICES FOR INTERNAL ILLUMINATION OF TRAFFIC CONES AND OTHER TRAFFIC CHANNELIZING DEVICES

RELATED APPLICATION

This application claims priority to U.S. Provisional Patent Application No. 63/309,426 entitled Networkable Devices for Internal Illumination of Traffic Cones and Other Traffic Channelizing Devices filed Feb. 11, 2022, the entire disclosure of which is expressly incorporated herein by reference.

FIELD

The present disclosure relates generally to the fields of electronics, traffic engineering and public safety and more particularly to devices and methods useable for channelizing vehicular traffic, warning drivers of hazards, and enhancing traffic safety.

BACKGROUND

Pursuant to 37 CFR 1.71(e), this patent document contains material which is subject to copyright protection and the owner of this patent document reserves all copyright rights whatsoever.

Applicants are developing a variety of electronic flares and other systems for traffic guidance and safety, examples of which are described in U.S. Pat. No. 8,564,456 entitled Sequenced vehicular traffic guiding system; U.S. Pat. No. 8,154,424 entitled Sequenced Vehicular Traffic Guiding System; U.S. Pat. No. 9,288,088 entitled Synchronizing the Behavior of Discrete Digital Devices; U.S. Pat. No. 9,847,037 entitled Sequenced Guiding Systems for Vehicles and Pedestrians; U.S. Pat. No. 9,835,319 entitled Sequential and Coordinated Flashing of Electronic Roadside Flares with Active Energy Conservation; U.S. Pat. No. 10,551,014 entitled Portable Electronic Flare Carrying Case and System; U.S. Pat. No. 10,443,828 entitled Sequential and Coordinated Flashing of Electronic Roadside Flares with Active Energy Conservation; U.S. Pat. No. 10,536,519 entitled Synchronizing the Behavior of Discrete Digital Devices and 10,660,183 entitled Devices and Methods for Synchronized Signaling of the Positions of Moving Pedestrians or Vehicles, 11,013,091 entitled Devices and Methods for Synchronized Signaling of the Positions of Moving Pedestrians or Vehicles and United States Patent Application Publication No. 2001/0237777 entitled Devices and Methods for Channelizing Vehicular Traffic and Enhancing Workzone Safety, the entire disclosure of each such patent and published patent application being expressly incorporated herein by reference.

This patent application describes new devices, systems and methods for internal illumination of traffic cones and other traffic channelizing devices. As explained below, certain electronic components and functions of the herein-described illuminating devices may be the same as or adaptations of electronic components and functions described in any of the above-listed patents and published patent application.

SUMMARY

Described herein are devices, systems and methods for internal illumination of traffic cones or other traffic channelizing or marking devices such as barrels, tubes, some buoys, some types of signs, etc., having hollow or open interior spaces and wall(s) which is/are fully or partially translucent or allow light to pass therethrough.

In accordance with the present disclosure there is provided an illumination device is attached to or integrated into a the traffic cone or other channelizing/marking device (e.g., a cone, barrel, tube, drum, buoy, etc.) and is equipped with emitters configured to cast light (visible and/or invisible) and/or other energy into an interior space of the cone or other channelizing/marking device such that at least some of the light or other energy will pass through at least partially translucent wall(s) of the thereby making the cone or other channelizing/marking device more visible to, or more detectable by, oncoming vehicles or pedestrians.

Further in accordance with the present disclosure there is provided an illuminating device formed on or configured for attachment at or near a bottom of the traffic cone or other traffic channelizing/marking device that has a hollow inner space and a wall that is fully or partially translucent, said illumination device comprising: a base member; a plurality of emitters positioned on the base so as to cast light and/or other energy onto an inner surface of the fully or partially translucent wall such that at least some of said light or other energy will pass though the fully or partially translucent wall; a rechargeable power source; radiofrequency transmitting and receiving apparatus configured for radiofrequency communication with one or more other devices; and electronic circuitry configured for powering and controlling the emitters.

Further in accordance with the present disclosure there is provided an illuminating device formed on or configured for attachment at or near a bottom of the traffic cone or other traffic channelizing/marking device that has a hollow inner space and a wall that is fully or partially translucent, said illumination device comprising: top and bottom portions which combine to attach the illumination device to the traffic cone or other channelizing/marking device; a plurality of emitters positioned to cast light and/or other energy onto an inner surface of the fully or partially translucent wall such that at least some of said light or other energy will pass though the fully or partially translucent wall; a rechargeable power source; radiofrequency transmitting and receiving apparatus configured for radiofrequency communication with one or more other devices; and electronic circuitry configured for powering and controlling the emitters.

Further in accordance with the present disclosure, there are provided methods for using illuminating devices as disclosed herein comprising: causing the illuminating device to be attached to or incorporated in the traffic cone traffic cone or other traffic channelizing/marking device; and using the illuminating device to cause visible light. Invisible light or other energy to be emitted from the traffic cone traffic cone or other traffic channelizing/marking device.

Further aspects, elements, variations and details of the presently disclosed devices, systems and methods may be appreciated from the accompanying drawings and the details descriptions of certain embodiments or examples set forth below.

BRIEF DESCRIPTION OF THE DRAWINGS

The accompanying FIGS. 1 through 16 show certain non-limiting examples or embodiments of a novel illumination device and related systems and methods. These drawings are illustrative but not limiting. These drawings are not intended to show all possible examples and embodiments of the herein-disclosed devices, systems and methods.

FIG. 1 is a front perspective view of one embodiment of a system according to the present disclosure comprising a traffic cone, networkable illuminating base with attachment clamps and charging electrodes.

FIG. 2 is a top perspective view of the networkable illuminating base with the attachment clamps and charging device of the FIG. 1 embodiment.

FIG. 3 is a bottom perspective view of the networkable illuminating base and attachment clamps of the FIG. 1 embodiment.

FIG. 4 is a perspective view of another of a system according to the present disclosure comprising a traffic cone, networkable illuminating base with upper and lower portions and charging electrodes.

FIG. 5 is a front elevational view of the system of FIG. 4.

FIG. 6 is a bottom view of the system of FIG. 4.

FIG. 7 is a partial bottom perspective view of the system of FIG. 4.

FIG. 8 is a partial cross-sectional view through line 8-8 of FIG. 7.

FIG. 10 is a perspective view of the bottom portion of the system of FIG. 4.

FIG. 11 is a partial view of the top portion of the system of FIG. 4 showing certain internal components.

FIG. 12 shows a circuit assembly component and charging electrodes of the system of FIG. 4.

FIG. 13 is a partial enlarged view of the bottom portion of the system of FIG. 4 showing the light emitting circuit and associated structural elements upon which it is mounted.

FIG. 14 is a sectional diagram showing stackable units comprising traffic cones with networking illuminating bases attached thereto, stacked one atop another.

FIG. 15 is a bottom view of an alternative top portion of the system of FIG. 4 incorporating optional strengthening ribs.

FIG. 16 is a partial cut-away view of the alternative top portion of FIG. 15 when positioned on the bottom portion as in typical use.

DESCRIPTION AND EXAMPLES

The following describes certain aspects of the present disclosure and, where relevant, refers to the non-limiting examples shown in the accompanying drawings.

The accompanying drawings show non-limiting examples of systems 10 and 100 useable for illumination and networking of traffic cones and other traffic channeling/marking devices. The term "illumination," as used herein, shall be construed to encompass not only illumination by visible light but also, additionally or alternatively, illumination by invisible light (e.g., infrared) or emission of other signals or forms of energy (e.g., GPS, sonic, ultrasonic, electronic, radio, etc.) that can be detected by a suitable sensor or detector device located on or associated with an oncoming vehicle or pedestrian. This includes, but is not limited to, infrared and other types of signals that are detectable and useable by autonomous vehicles. The term "vehicles" as used herein shall not be limited to motor land vehicles, but shall be construed to include aircraft, trains, trams, subways and other rail vehicles, and watercraft or marine vessels.

Figure 1A:
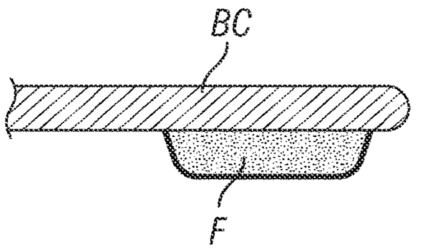
FIG. 1A is a partial sectional view through a portion of the base of the traffic cone of FIG. 1 showing a foot member that extends downwardly from the cone base.
Figure 1:
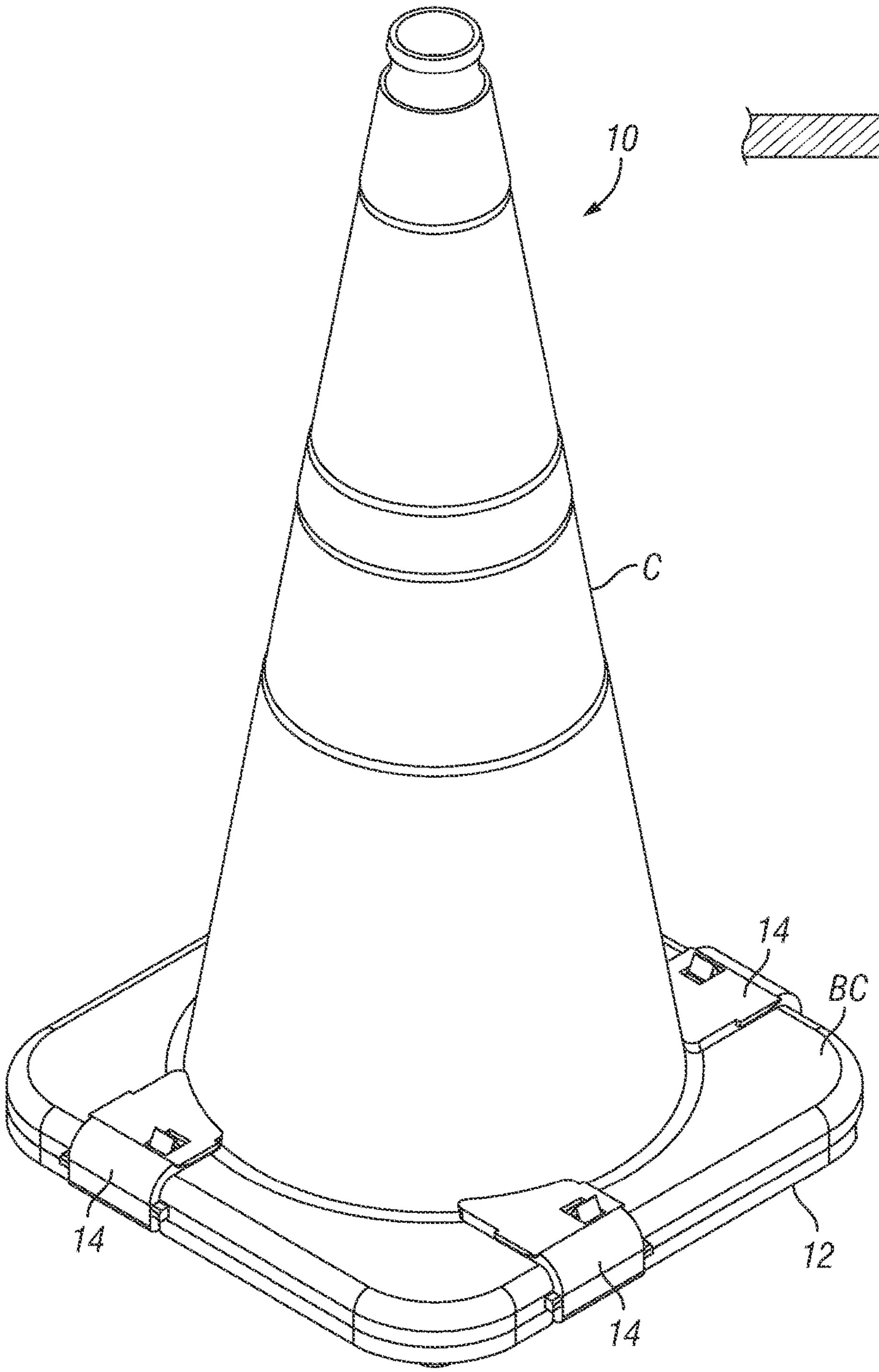
Figure 2:
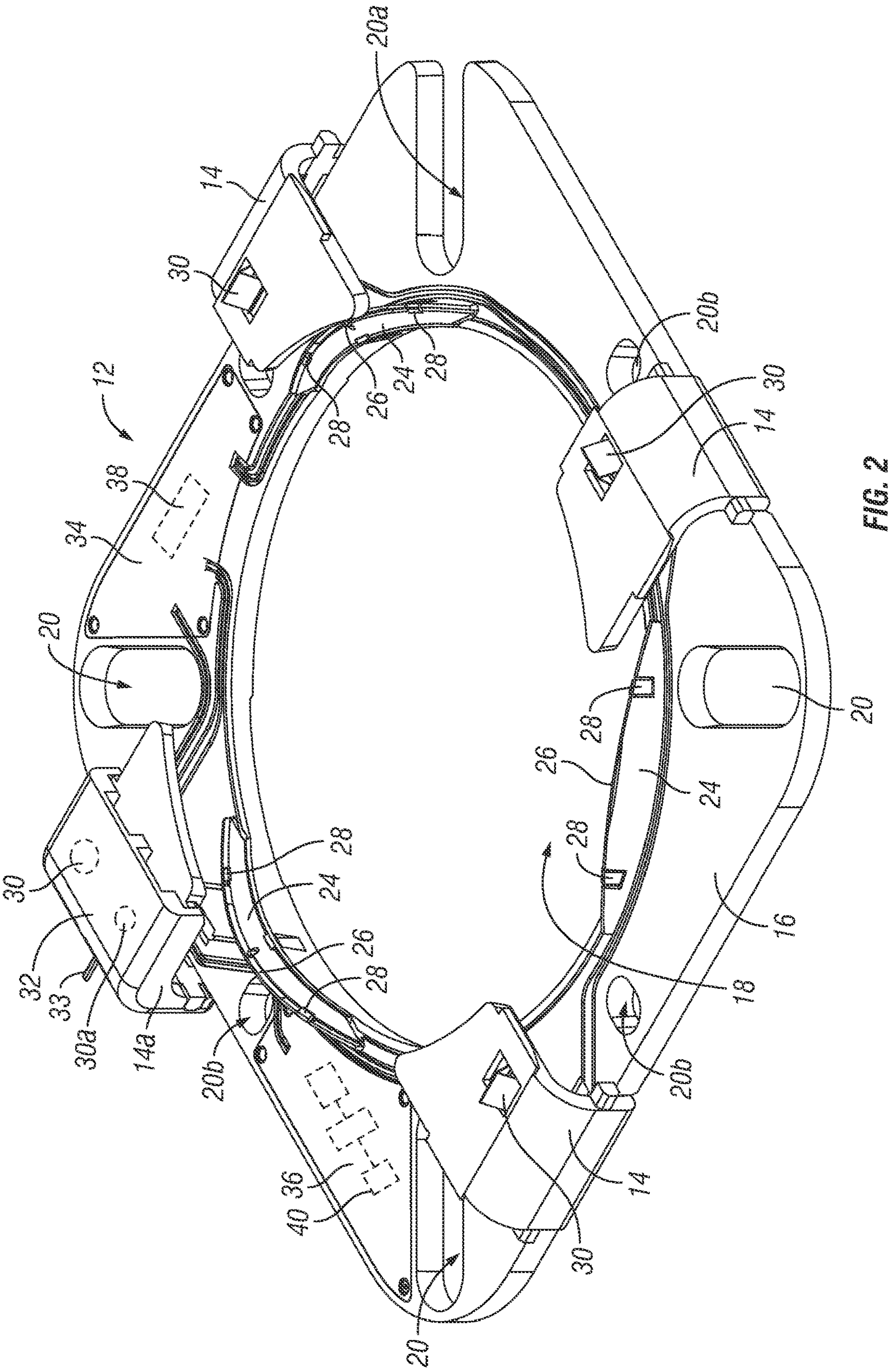
Figure 3:
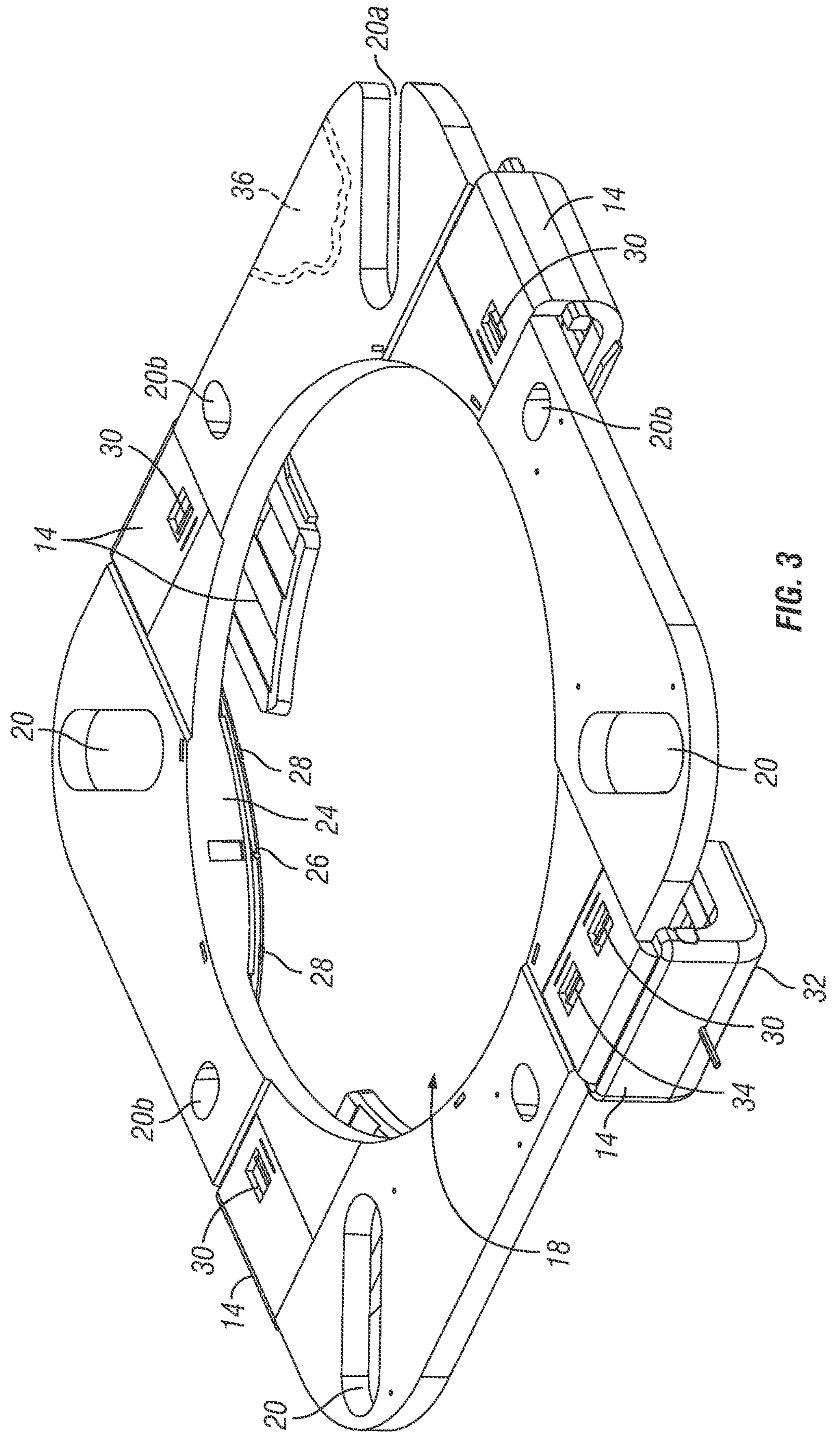

FIGS. 1 through 3 show a first embodiment of a system 10 which comprises a traffic cone C with an illumination device 12 that is attachable to the traffic cone C by way of clamps 14, 14*a*. The traffic cone C comprises an upstanding conical body defined by a frusto-conical sidewall, all or part(s) of which is/are translucent. The traffic cone C has a hollow inner space within the frusto-conical sidewall with an opening at the bottom end of the hollow inner space. A cone base BC comprises a flange that extends about the perimeter of the open bottom end of the conical body.

As illustrated in FIG. 1A, the traffic cone C in this example has a plurality of optional foot members F that extend downwardly from the bottom side of the cone base BC. These foot members F may be formed of rubber or elastomeric material and are configured to provide stable points of contact with an underlying road surface upon which the traffic cone C is placed. Not all traffic cones include such foot members F and, as explained below, the illumination device may be configured for use with traffic cones that have, or do not have, such foot members F.

In addition, it is to be noted that although the example shown in the drawings utilizes a traffic cone C, the illumination device described herein may be alternatively useable with other types of traffic channelizing and marker devices having translucent walls, such as tubular delineators, plastic drums or barrels, etc.

As seen in FIGS. 2 and 3, the illumination device 12 comprises a base 16 having a central aperture 18 that is slightly smaller in diameter than the open bottom end of the conical body of the traffic cone C. Optional passages, slots or openings 20, 20*a*, 20*b* are formed in the base 16. These passages, slots or openings 20, 201, 20*b* are located and configured to correspond to the foot members that extend downwardly from the cone base BC. When the illumination device 12 is attached to the traffic cone C as seen in FIG. 1, the foot members F of the traffic cone C will extend through the passages, slots or openings 20, 201, 20*b* Such that the bottoms of the foot members F will contact an underlying road surface on which the system 10 is placed.

As shown on the bottom view of FIG. 3, in alternative embodiments of the illumination device 12 intended for use with traffic cones or other traffic channelizing or marking devices that do not include foot members F, a plurality of foot members or layer(s) of elastomeric or rubber material 36 may optionally be provided on the bottom surface of the base 16 to provide for non-slip contact between the system 10 and an underlying road surface on which the system 10 is placed.

As seen in FIG. 2, upstanding projections 24 are formed along the edge of the central aperture 18. Light emitters 28 (e.g., light emitting diodes (LEDS, emitting visible or infrared light) or radio-transmitters (for autonomous vehicles utilizing infrastructure to vehicle communication) and associated circuitry (e.g., wires and/or circuit boards which drive and control the LEDs) are mounted on these upstanding projections 24 so as to cast light upwardly onto an adjacent inner surface and the opposite surface of the fully or partially translucent side wall of the traffic cone C. At least some of this light passes through or will pass through the fully or partially translucent wall, thereby internally illuminating the traffic cone C to enhance its visibility to oncoming vehicular traffic. In the example shown, the projections 24 comprise curved ridges. However, these projections 24 may take any suitable configuration or form such as, for example, one or more bumps, bosses, protrusions, rim(s), etc. In addition to serving as mounting structures for the light emitters 28, these upstanding projections 24 may also function as guides or locators to facilitate proper positioning of the illumination device 12 on the traffic cone C or other traffic channelizing/marking device. For this purpose, the projections 24 shown in the drawings are slanted, curved or tilted inwardly so that the top ends of the projections 24 can loosely insert into the open bottom end of the hollow inner space of the traffic cone C and will progress to a more snug fit as the traffic cone C is pushed down to its operative installed position with the bottom side of the cone base BC abutting against the top surface of the base 16 of the illumination device 12. Thereafter, the clamps 14, 14*a* are applied to attach the illumination device 12 to the traffic cone C. Alternatively, in some embodiments, the projections 24 or other aspects of the illumination device 12 may be configured to snap fit or otherwise firmly engage the traffic cone C without the need for the use of clamps 14 or 14*a*.

In the example shown, each of the clamps 14 and 14*a* is equipped with a stacking electrode contact 30 configured to form electrical engagement with neighboring illumination devices 12 when a plurality of these devices 12 are stacked one atop another. In addition, one of the clamps 14*a* is also equipped with a charging electrode contact 30*a*. When a number of traffic cones C with attached illumination devices 12 are stacked one atop another, the stacking electrode contacts 30 will engage one another thereby interconnecting the electrical circuitry of all illumination devices 12 in the stack. A charging cap 32 is connected by cable 33 to a power source such as a 12 volt or 110 volt power outlet and positionable on clamp 14*a* of one of the stacked illumination devices 12 (e.g., the one on the top of the stack). In this manner, power from the power source is initially delivered to only one of the stacked devices 12 via its charging contact 30*a* and such charging power then distributes to all of the other devices 12 in the stack via the serially engaged stacking electrodes 30. In this way, a single connection to a power source is useable to charge the batteries 38 located in battery compartments 34 of all devices 12 in the stack.

Furthermore, the electrodes are situated such that rotation of any member of the stack by 90 degrees will allow continued charging of the entire stack. The circuit is designed to automatically reverse and maintain proper polarity during charging using a single electrode. The operator need not line up the cones in a particular stacking arrangement to achieve proper charging polarity. Any stacking order and orientation based upon corner-to-corner alignment will suffice.

When the illumination devices 12 have been charged, the charging cap 32 is removed and the fully charged systems 10 (i.e., traffic cones C with attached illumination devices 12) may be deployed in a row, array or any other desired configuration on a road surface. Alternatively, the system of multiple traffic cones may delineate a temporary landing zone for both rotary and fixed wing aircraft, guide vehicles and pedestrians at special events or mass evacuation, or guide autonomous vehicles that incorporate sensors tuned to the infrared or radio spectrum.

In routine operation, illumination devices 12 as shown in FIGS. 1 through 3 are useable in conjunction with traffic cones which have foot members F as follows:

1. Position each illumination device 12 on a traffic cone C such that the upstanding projections 24 insert upwardly into the hollow inner space of the cone adjacent to the inner surface of the cone sidewall and the foot members F of the cone C are aligned with and protrude downwardly through openings 20, 20*a* and 20*b*.
2. Use clamps 14 to clamp each illumination device 12 to the adjacent cone base BC at locations where the clamps 14 will also engage single stacking electrode contacts on the illumination devices 12.
3. Use clamps 14*a* to clamp each illumination device 12 to the adjacent cone base BC at locations where the clamps 14*a* will engage both single stacking electrode contacts on the illumination devices 12 and charging electrode contacts on the illumination devices 12.
4. Stack the traffic cones C with the attached illumination devices 12 one atop another.
5. Connect the cable 33 of the charging cap 32 to a suitable power source (e.g., either a 12V or 110V power source) and place the charging cap 32 on the clamp 14*a* that is attached to the top unit of the stack, thereby delivering charging electrical current the batteries 38 of all illumination devices 12 in the stack.
6. When adequately charged, detach the charging cap 32, and deploy the traffic cones C with attached illumination devices 12 are desired locations on a road surface.
7. Power up all of the illumination devices 12 using switches on the devices 12 or a remote controller (e.g, laptop computer, smart phone, dedicated controller, etc.). Alternatively, the cone lamp, through the programming of the microcontroller and accelerometer, could be programmed to turn on automatically when dropped on the highway. The zero-G acceleration sensed by a falling cone (of a few centimeters or more) following by a rapid deceleration (negative G in the Z, X, or Y direction) would be sensed and result in a command to turn on the device.
8. Optionally, for illumination devices 12 equipped to communicate and function as nodes of a mesh or other network, use switches on the devices 12 or a remote controller (e.g., laptop computer, smart phone, dedicated controller, etc.) to control synchronized emission of light from the light emitters in a desired pattern or sequence, examples of which are described in incorporated U.S. Pat. No. 10,443,828 entitled Sequential and Coordinated Flashing of Electronic Roadside Flares with Active Energy Conservation; U.S. Pat. No. 10,536,519 entitled Synchronizing the Behavior of Discrete Digital Devices.
9. Optionally, for illumination devices 12 equipped to sense or receive and transmit information (e.g., device location, sensor-determined device status or event information, or other information, use the included transmitter(s) to directly or indirectly transmit such information to the intended data center, receiving device or service (e.g., General Motors OnSTar™ System, HERE Technologies System, WAZE or Smartway) via cellular, telephonic, internet, fiber-optic or other wired or wireless communication.
10. Unlike traditional passive traffic cones, this device will actively monitor its orientation relative to the horizontal and notify, via radio transmitters and/or cloud connectivity, personnel when it is struck by a vehicle, moved by a pedestrian, blown over by truck-induced wind wake, or high winds experienced during inclement weather.

11. Thereafter, when no longer needed or when due for re-charging, collect the traffic cones C with attached illumination devices 12 and repeat steps 4, 5 and 6 above.

As described above, FIGS. 1 through 3 show an embodiment in which the illumination device 12 is essentially a one-piece device that attaches to a cone base CB by way of clamps 14. FIGS. 4 through 16, described below, show an alternative embodiment wherein the illumination device 101 is a two-piece structure comprising a top portion 102 and a bottom portion 104.

Figure 4:
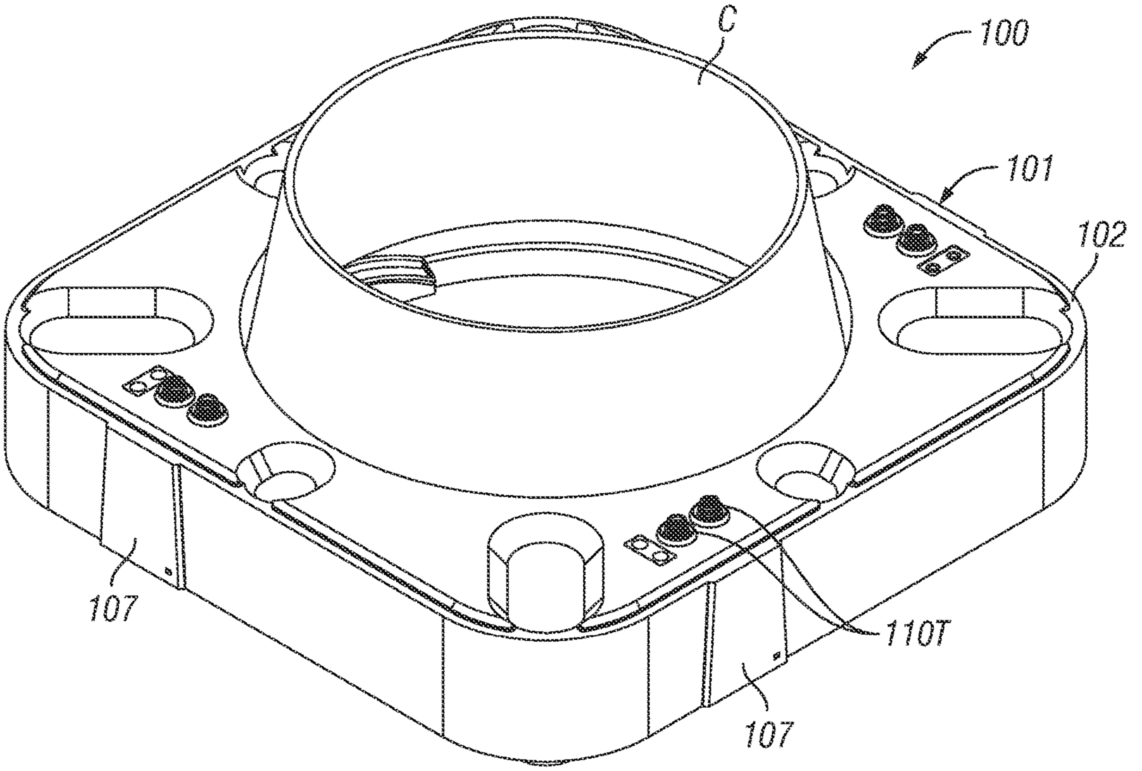
Figure 5:
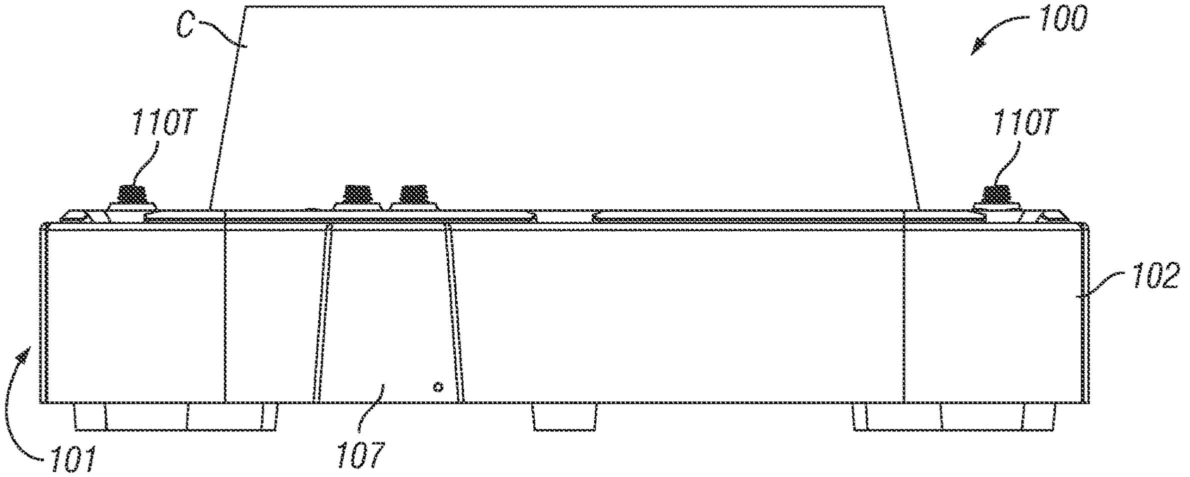
Figure 6:
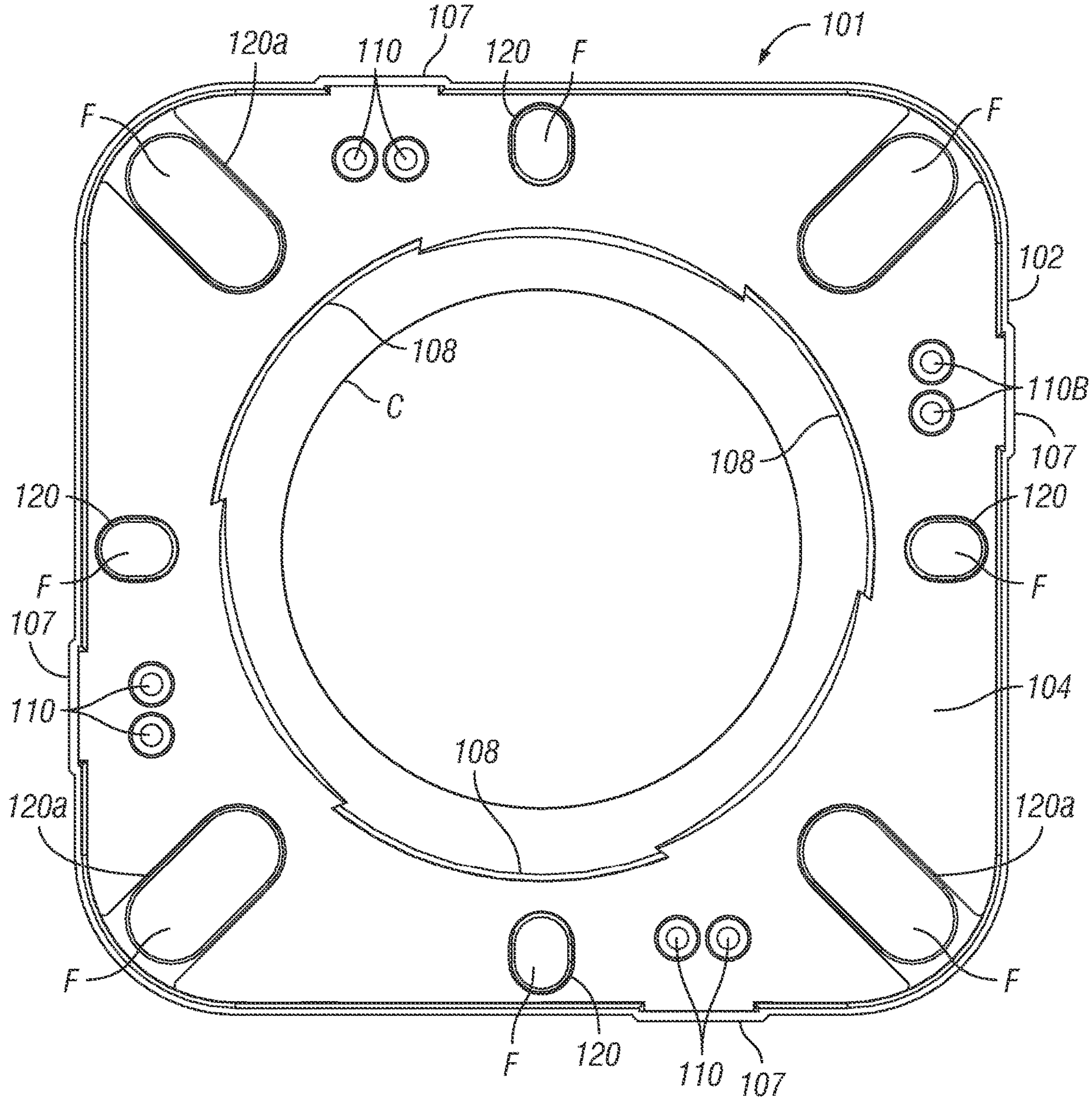
Figure 7:
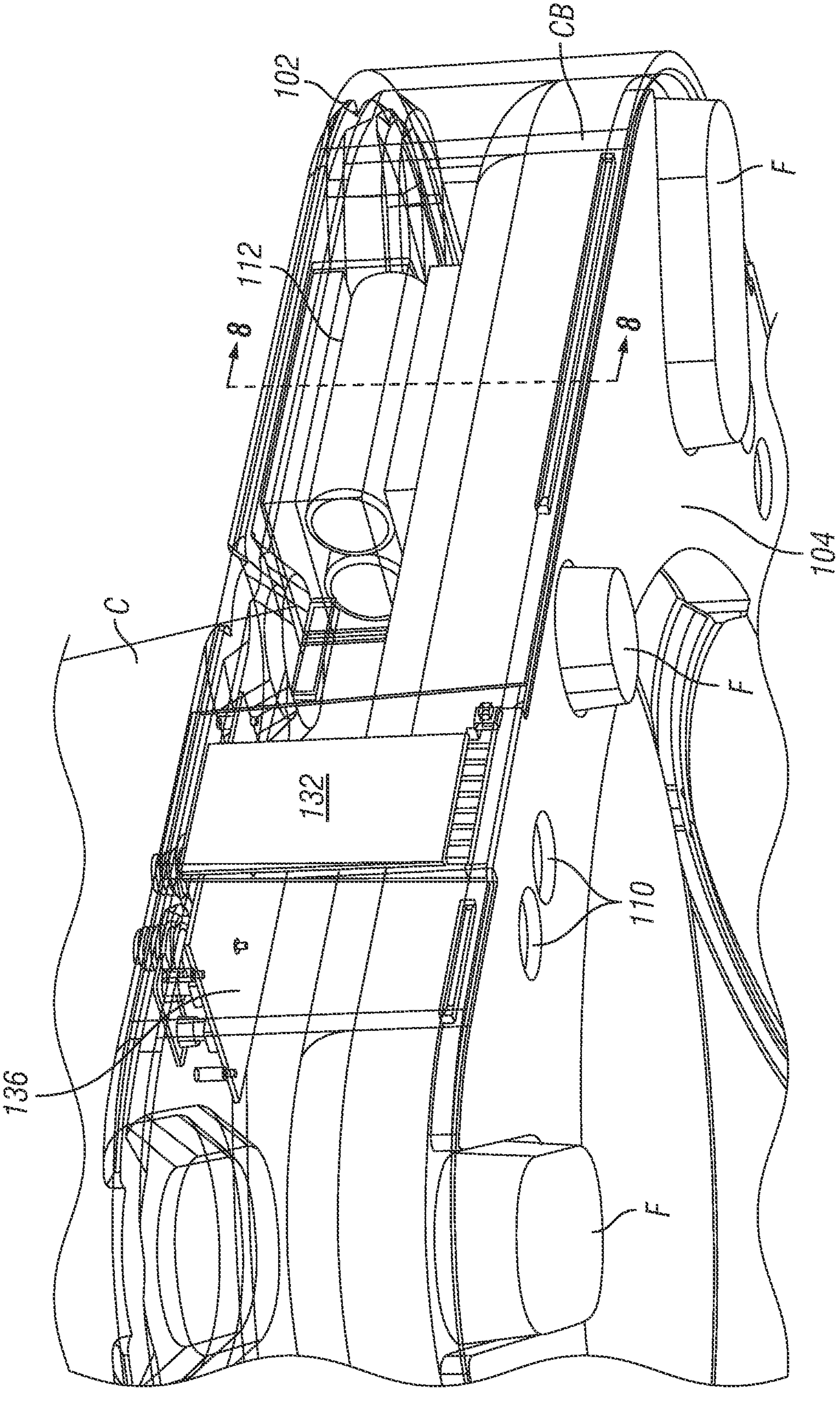

In the alternative embodiment shown in FIGS. 4 through 16, the illumination device 101, the bottom portion 104 is positioned beneath the cone base CB. The top portion 102 is then mounted over top of the cone base CB and connected to bottom portion 104 so as to capture the cone base CB between the top 102 and bottom 104 portions, thereby forming an assembled system 100 in which the translucent body of the cone C extends upwardly through a central aperture of the top portion 102, as shown in FIG. 4. As in the above described first embodiment, the bottom portion 104 may optionally have apertures 120 and/or slots 120*a* through which foot members F of the come base CB may protrude.

Pairs of top charging electrodes 110T are present on the top portion 102 and pairs of bottom charging electrodes 110B are present on the bottom portion 104, so that charging current will be supplied to a number of cones C simultaneously when the cones C are stacked one on top of another. Such charging electrodes 110T, 110B may be spring electrodes, as shown, or any other suitable type of contact plates or other electrode configurations.

Referring in particular to FIGS. 7 and 10-12, the top charging electrodes 110T may extend upwardly from top platform circuit boards 136 which are present in the top portion 102. Vertical circuit boards 132 extend downwardly from the top platform circuit boards 136. The bottom end of each vertical circuit board 132 becomes connected, by way of connectors 114 such as pogo type connectors, to a bottom circuit board 132 in the bottom portion 104 when the top portion 102 becomes attached to the bottom portion 104. When the top portion 102 is attached to the bottom portion 104 in this manner, the vertical circuit boards 132 may pass through recesses or outcropped passages 107 formed in side walls of the top portion 102, as seen in FIGS. 4, 5, 6 and 9A and provide electrical continuity between the circuitry in the bottom portion 104 and that of the top portion 102.

The top platform circuit boards 136 are connected to battery packages 112 having rechargeable batteries 114, and include electronic circuit components which facilitate charging and, in some embodiments remote status checking, of batteries 114. Some components of the top platform circuit boards 132 may be housed in enclosures or housings 138 which are connected to the vertical circuit boards 132 by hard wired, soldered connections 139. One top platform circuit board 136*a* may additionally include communication components for communication, such as e.g., radio, cellular, satellite, internet or other apparatus, for control, monitoring, networking (e.g., mesh network) and/or other communication between neighboring devices 100 and/or with other locations or devices such as gateway devices, remote controllers or cloud based control/monitoring locations.

Figure 8:
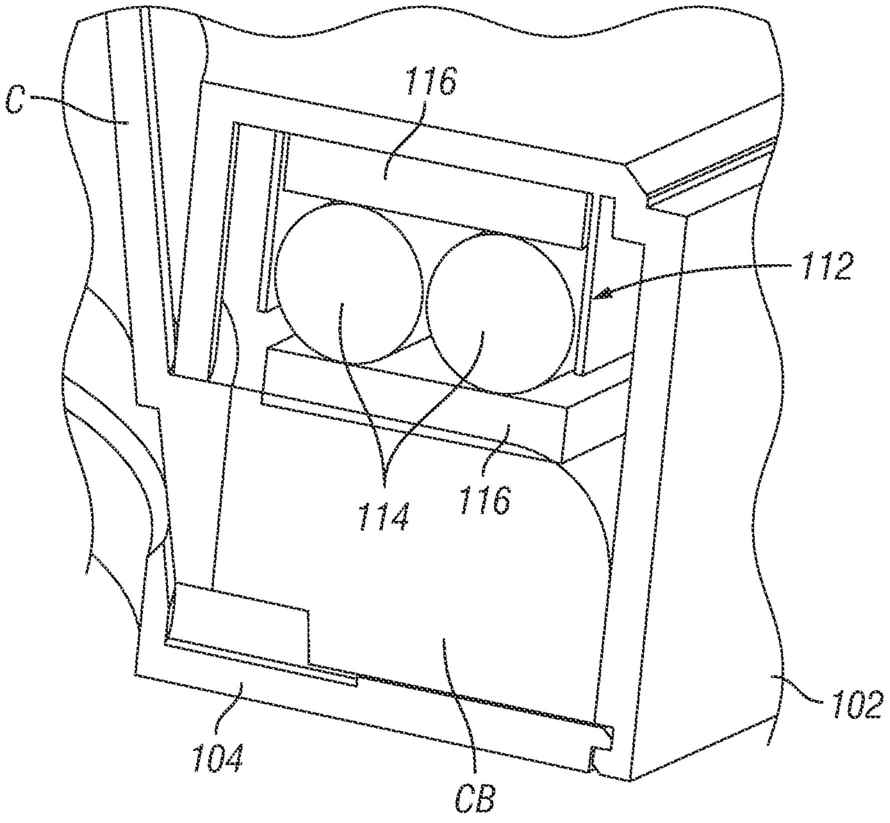

As shown in FIG. 8, the battery packages 112 may comprise adhesive pads 116 configured to contact and adhere to adjacent surfaces of the device 100 and/or cone base CB thereby firmly holding the batteries 114 in place after the illumination device 100 have been attached to the traffic cone C.

Figure 9A:
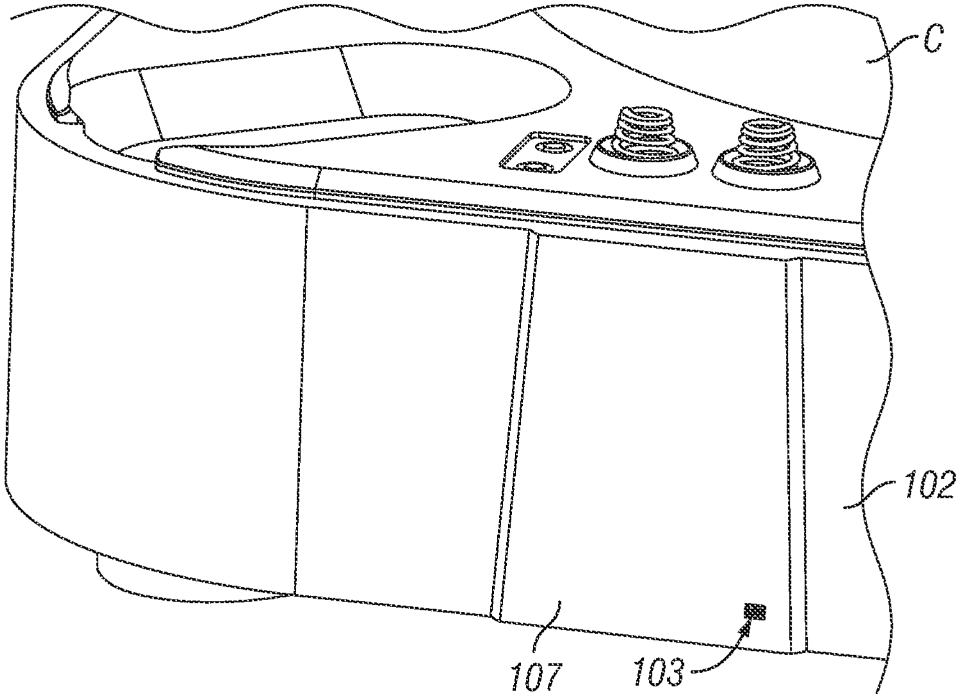
FIG. 9A is an enlarged view of a portion of the system of FIG. 4.
Figure 9B:
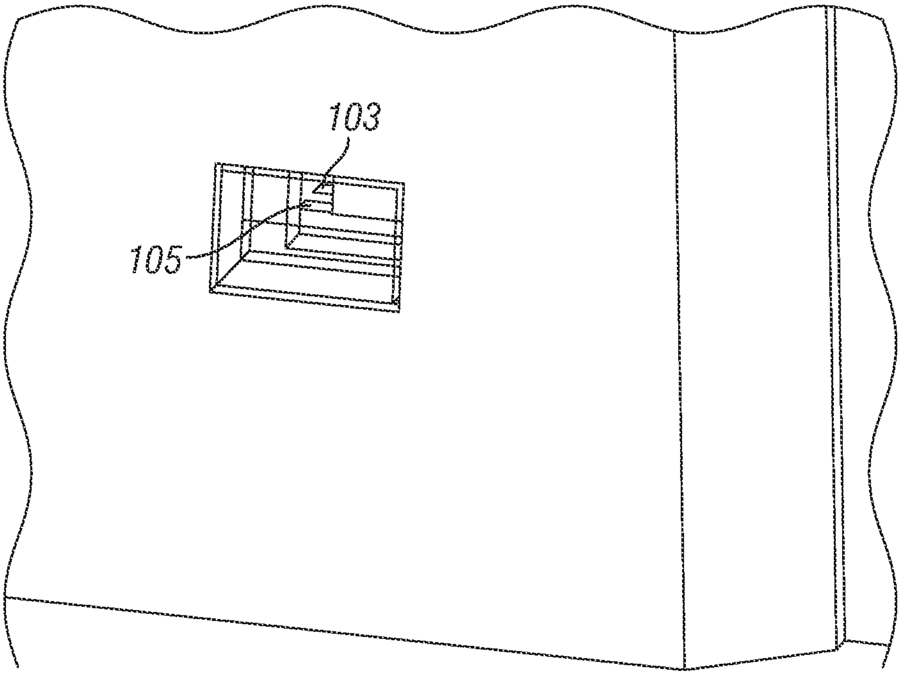
FIG. 9B is an enlarged view of a portion of the system of FIG. 4 showing a charging indicator, which is visible through a window or opening formed in the top portion of the networkable illuminating base.
Figure 10:
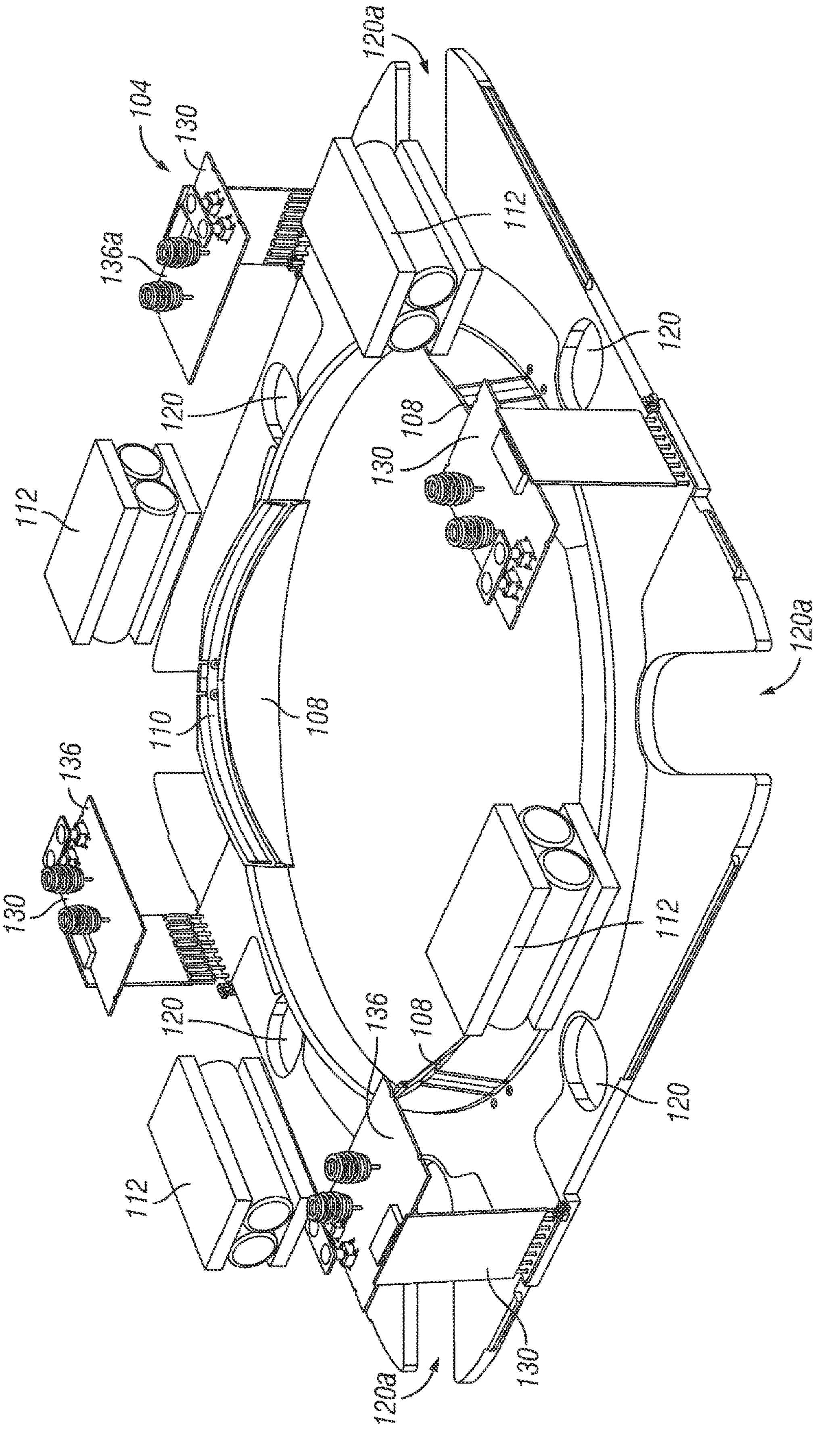
Figure 11:
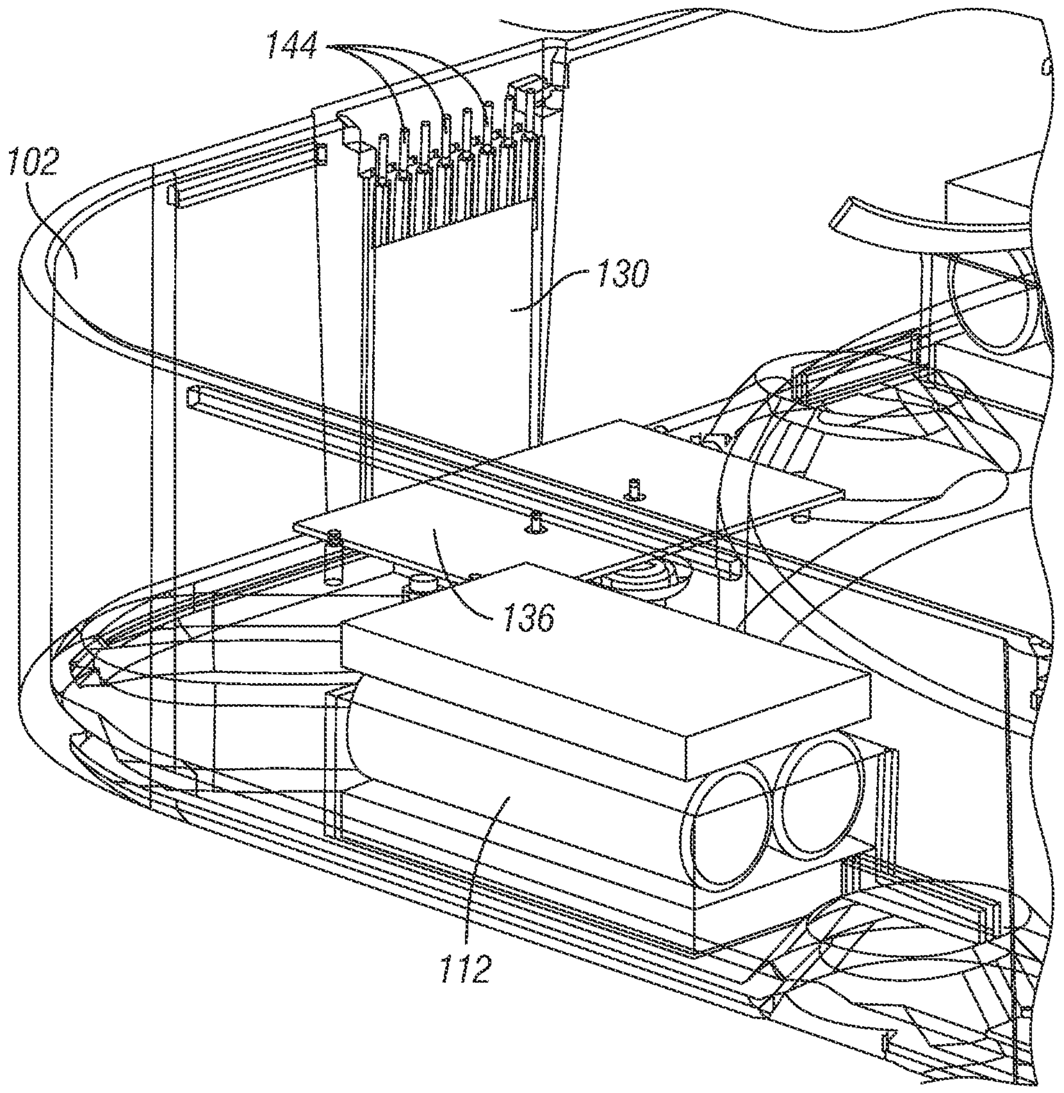
Figure 12:
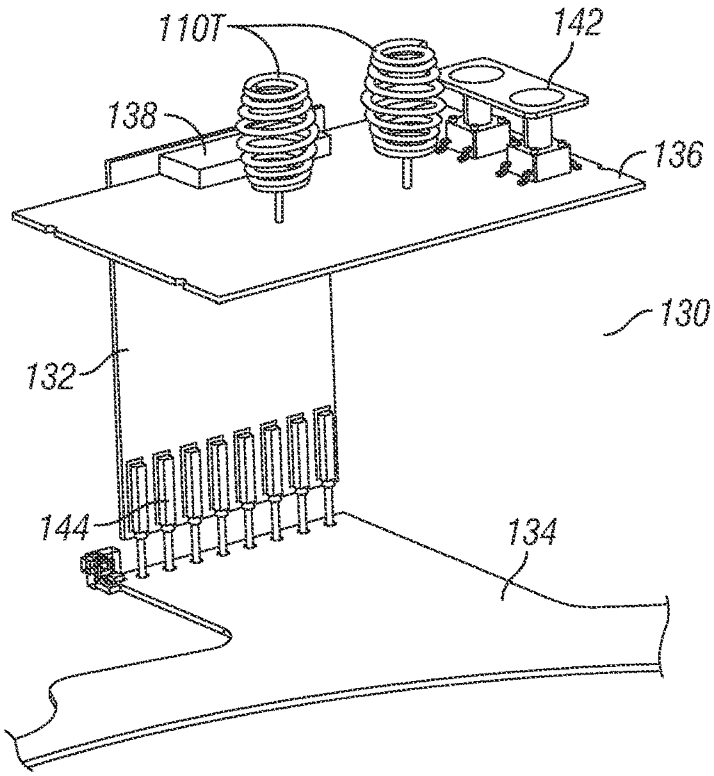
Figure 12A:
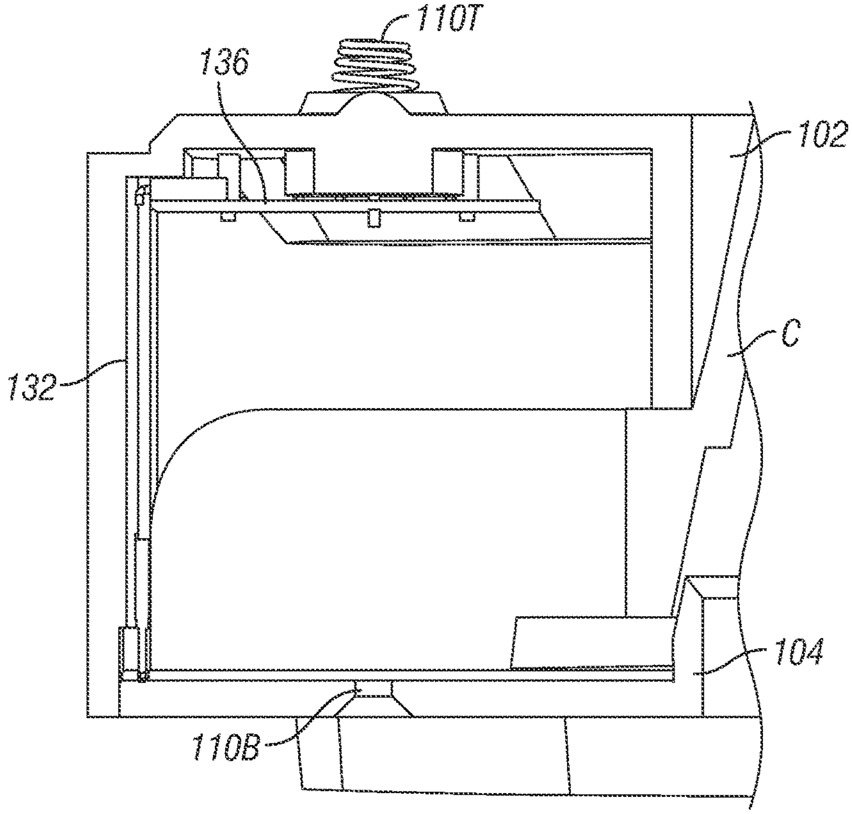
FIG. 12A is a sectional diagram showing the circuit assembly and charging electrodes if FIG. 12 positioned within the system following attachment to the base of a traffic cone.
Figure 12C:
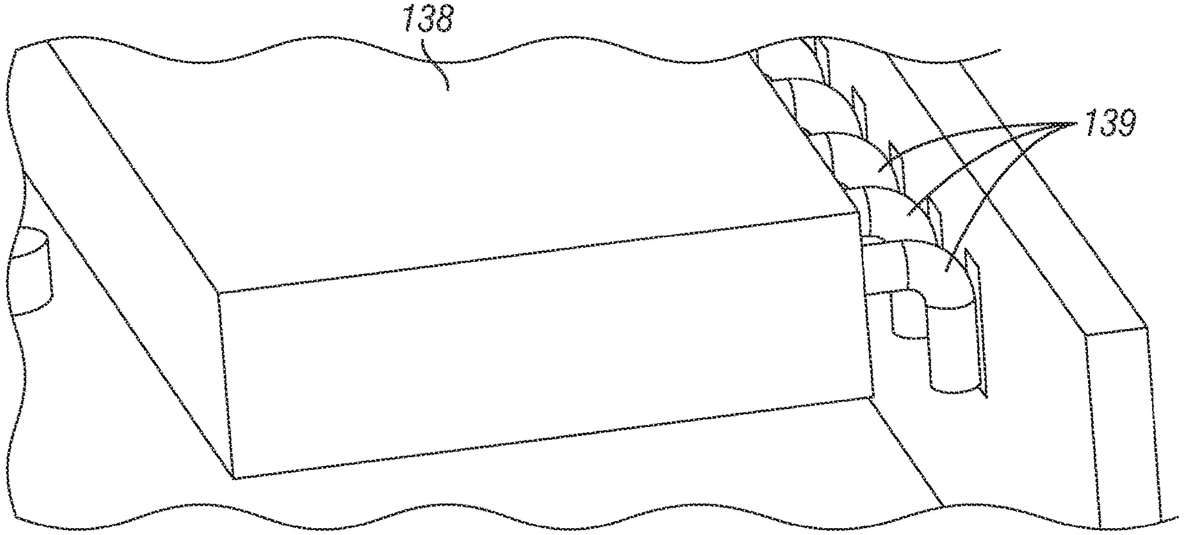
FIG. 12C is an enlarged view of an electronics housing component of the circuit assembly shown in FIG. 12.
Figure 13:
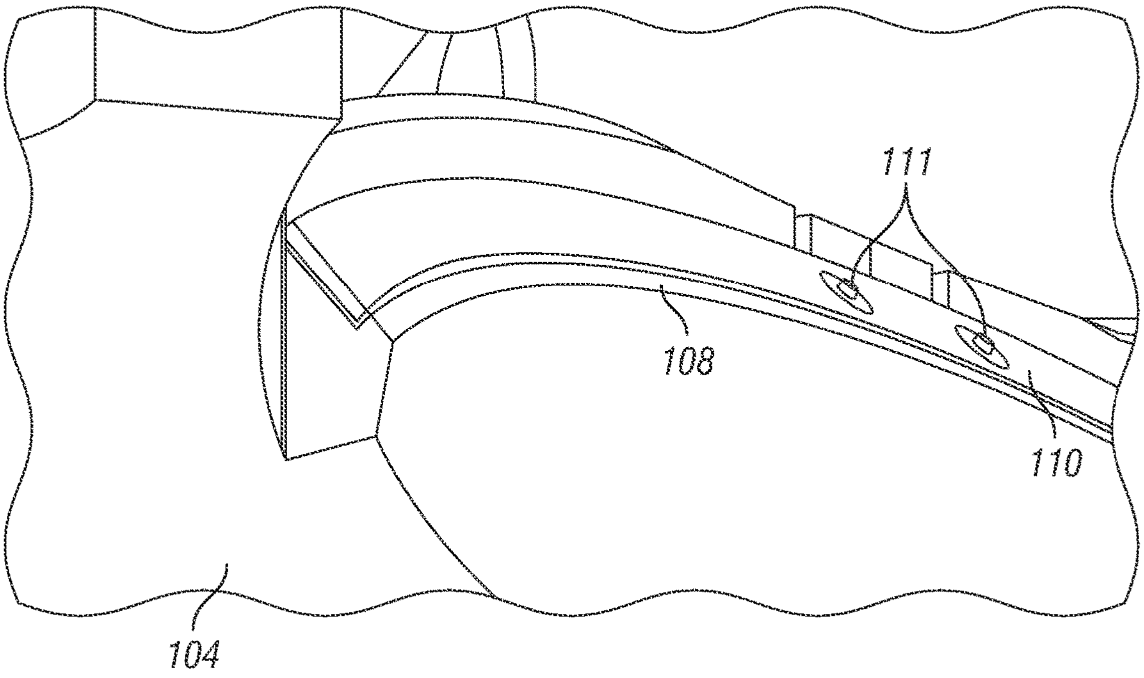

As explained above, a number of stackable units comprising cones C having these illumination devices 101 attached thereto, can be stacked, one upon another, such that the top charging electrodes 110T connect with bottom charging electrodes 110B of neighboring devices 101 in the stack. When any one of the stacked devices 110 is connected to a source of charging electrical current, such current will distribute to each of the devices 100 in the stack. As shown in FIGS. 9A and 9B, windows or openings 103 may be formed in recesses or outcropped passages 107 formed in the side walls of the top portion 102 of each device, or at any other suitable locations. Charging indicator light emitting diodes 105 may be positioned on the vertical circuit boards 130 or at any other suitable locations to emit light through the windows or openings 103, thereby indicating that that the batteries 114 of that device 100 are presently receiving charging current. This enables a user to visually verify that all devices 100 in a stack are in electrical contact with one another and receiving charging current as intended.

As may be appreciated from FIGS. 7 and 13-14A, LED circuit boards 110 having cone illumination LEDs 111 are mounted on supporting structures 108 of the bottom portion 104. The supporting structures 108 are configured to protrude slightly into an area beneath the hollow or open inner space of the cone C. Light emitted from the cone illumination LEDs 111 illuminated the walls of the cone C. All or part of the wall of the cone C is translucent (e.g., formed of material that allows light to pass therethrough and/or incorporates translucent or open areas or windows or fenestration through which light passes), This effectively causes the cone C to emit light (visible and/or invisible) or other form(s) of energy that visible to or detectable by oncoming vehicles or pedestrians. In some embodiments, the cone illumination LEDs 111 may emit visible light to visibly illuminate the cone C and other emitters may be located elsewhere on the device 110 to emit infrared light or other forms of energy for detection by appropriately equipped pedestrians or vehicles, such as self-driving or autonomous vehicles equipped to detect and use infrared light or other signals for navigation and/or guidance purposes.

Figure 14:
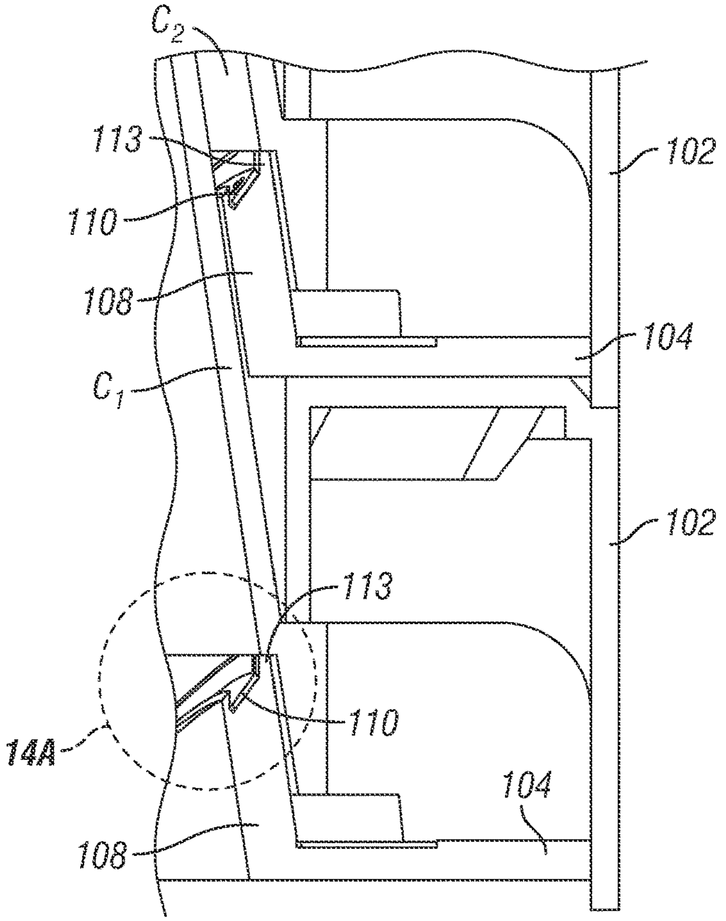
Figure 14A:
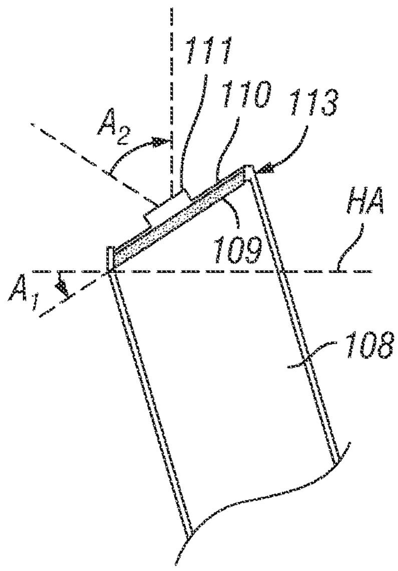
FIG. 14A is an enlarged view of portion 14A of FIG. 14.

Referring specifically to FIGS. 14 and 14A, the supporting structures 108 may have depressions or grooves 109 in upper edges thereof in which the LED circuit boards 110 are positioned. These depressions or grooves 109 may have a protective lip 113 which protects the LED circuit board 110 and its LEDs 111 from excessive wear or damage when the stackable units comprising cones C having these illumination devices 101 attached thereto are stacked on top of one another as seen in FIG. 14. Additionally, the support members 108, and the LED's 111 themselves may be constructed so as to optimize positioning of the LEDs 111 and even distribution of light from the LEDs over the wall of the cone C. In this regard, as shown in FIG. 14A, the support structure 108 and depression or grove 109 may be configured to hold the cone illuminating LEDs 111 at a specific tilt angle A1 relative to a horizontal axis to cast light from the cone illuminating LEDs 111 onto the wall of the cone contralateral to or across from the location of those particular LEDs 111. Also, the beam angle A2 of the cone illuminating LEDs 111 may be selected to provide appropriate or optimal distribution of light from the LEDs 111 over all or most of the wall of the cone. For standard traffic cones of the type commonly used on roadways in the United States, tilt angle A1 may be in the range of 30 degrees to 70 degrees above horizontal and the LED beam angle A2 may be in the range of 30 degrees to 120 degrees (15 to 60 degrees from centerline on each side). In the specific, non-limiting embodiment shown in the drawings, the tilt angle is 50 degrees and the LED beam angle is 120 degrees.

Figure 15:
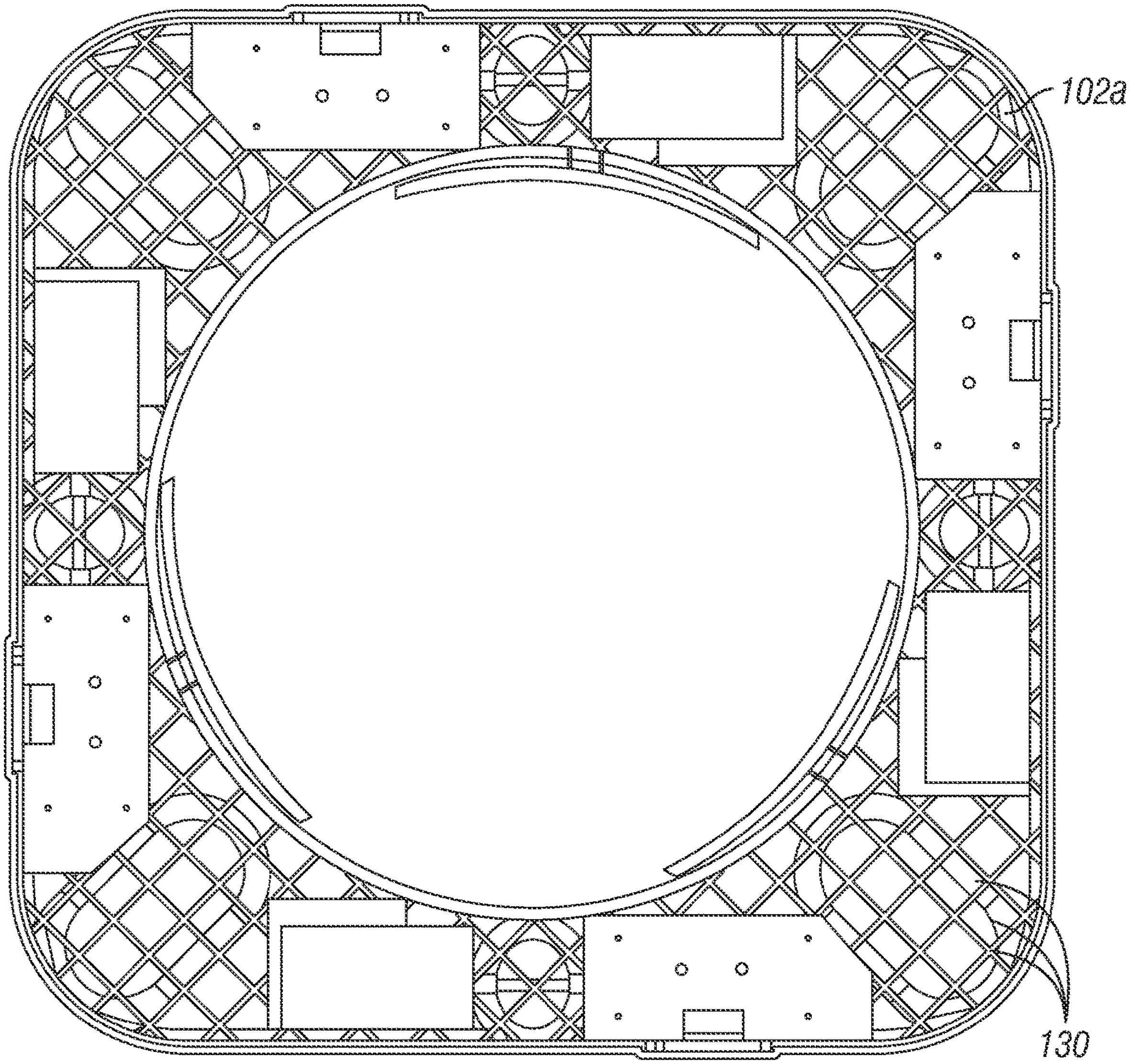
Figure 16:
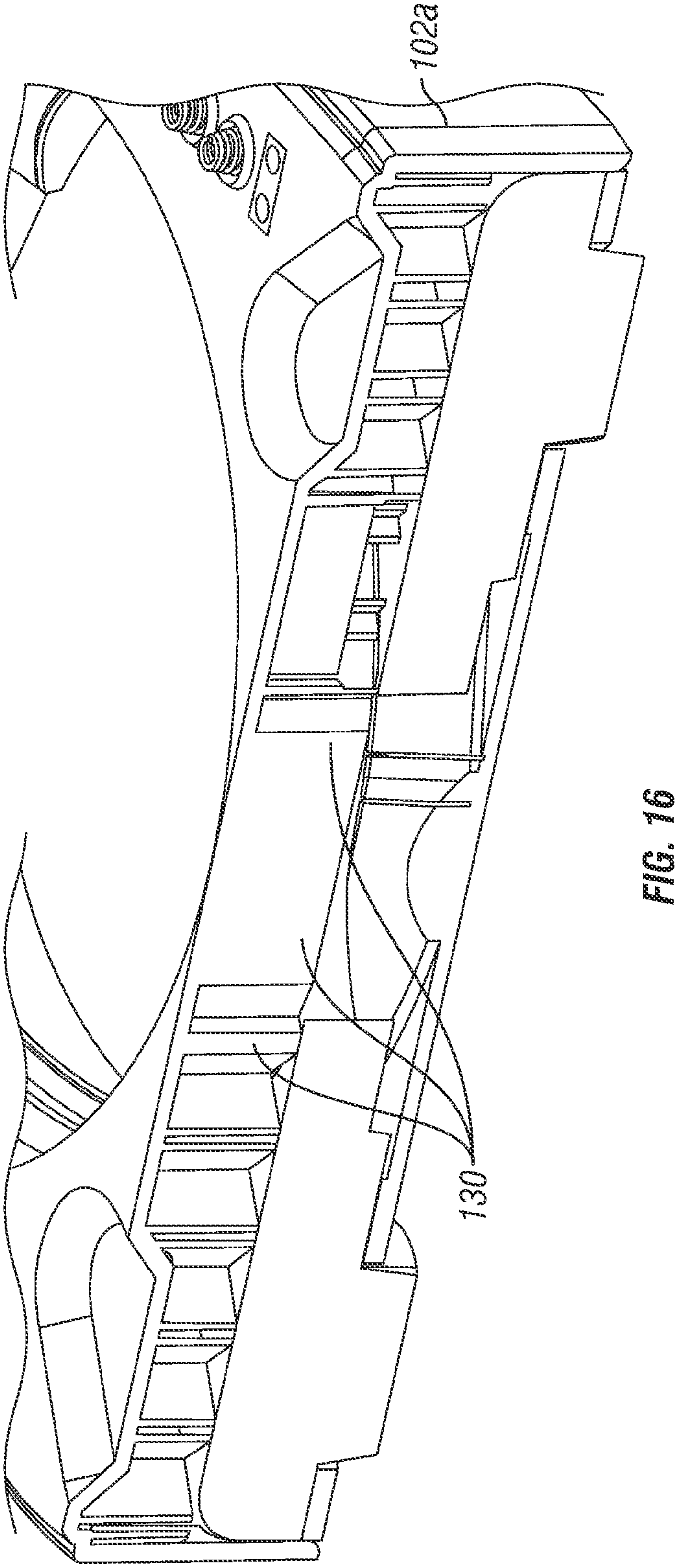

Traffic cones and channelizing/marking devices can be subject to rough use and may sometimes be run over by a vehicle or otherwise subjected to crushing forces. As shown in FIGS. 15 and 16, an alternative embodiment of the top portion 102*a* may optionally incorporate strengthening members 130 to enhance the strength and crush resistance of the illumination device 101. These optional strengthening members 130 may comprises ribs, bosses, waffle structures or other configurations.

As used herein, the term "road surface" is to be interpreted broadly as meaning any surface on which the traffic cones C with attached illumination devices 12 are placed, including not only paved or unpaved roadway surfaces but also parking lots, runways, driveways, floors, roofs, floating upon fluid or water surfaces, any other surfaces on which the system 10 may be operatively placed.

Optionally, any illumination device 12, 101 may have an electronics compartment 36 or other location(s) which house electronic components and circuitry for communication and/or control such as, for example, radiofrequency receiving and transmitting apparatus, sensor(s), satellite location determining apparatus (e.g., Global Positioning System (GPS), Global Navigation Satellite System (GNSS) devices or other geolocation systems), modems, energy emitters and other apparatus as described in any of the above incorporated United States Patents and Published United States Patent Applications.

In some embodiments of illumination devices 12, 101 may include components and circuitry configured to enable a plurality of these illuminating devices 12, 101 to operate as nodes of a mesh network so that their light emitters 28 operate in synchronized or coordinated fashion as described in any of the above incorporated United States Patents and published United States Patent Application and, specifically for example, in U.S. Pat. No. 10,443,828 entitled Sequential and Coordinated Flashing of Electronic Roadside Flares with Active Energy Conservation; U.S. Pat. No. 10,536,519 entitled Synchronizing the Behavior of Discrete Digital Devices. In other embodiments coordinated flashing of the devices 12 or 101 may be accomplished using other radio networks, including constant listening to neighbors while one device acts as a "coordinator" (previously referred to as Master/Slave network), external command timing with pre-numbered devices, light (including infrared light) transmission from one unit to the next unit in sequence for triggering purposes, and high precision real-time clocks with individual timing of sequential units based upon a stable clock. An alternative to mesh networks in which all devices are "equal", could be a network dependent upon an external timing signal derived from GPS receivers (highly accurate clock signals) or World Standard timing broadcasts (W W V in Ft. Collins, Colorado, for example). There are other sources of public domain timing signals broadcast worldwide that would aid in the coordinated flashing of multiple devices. If radio communication is used, low energy Bluetooth, Zigbee, Wi-Fi, or other proprietary networks are available and chosen based upon energy consumption, range, bandwidth requirements, etc.

In some embodiments, the components and circuitry may include location determining (e.g., geolocation) apparatus for determining the current location of the device using a satellite system, Global Positioning System (GPS) a Global Navigation Satellite System (GNSS) or other geolocation system.

In some embodiments, components and circuitry may include sensor(s) for sensing status of the illuminating device 12, 101 and/or other events such as; a change in the operational status or operational mode of the illumination device, movement or tipping over of the illumination device, impact on the illumination device, failure of the illumination device, or movement of a vehicle over top of or past the illumination device. Such sensors may provide the necessary components to form a "cone array" surrounding working personnel and to alert them should a vehicle encroach the work area and strike or pass one or more of the cones. Further details regarding such systems and functionality are described in copending U.S. patent application Ser. No. 18/090,088 entitled Vehicular Incursion Alert Systems and Methods, the entire disclosure of which is expressly incorporated herein by reference.

In some embodiments, the components and circuitry may also including transmitter(s) for transmitting information from the illumination device 12 or any incorporated components such as location determining apparatus and/or sensor(s) to a receiving device (in a vehicle in proximity, for example) or service via cellular, telephonic, internet, fiber-optic or other wired or wireless communication. Such transmission of information may be direct (e.g., radiofrequency, cellular or internet-based transmission from the illumination device 12 directly to the receiving device or service) or indirect (e.g., initial transmission of information from the illuminating device 12 to a gateway or intermediary device which then relays all or part of the information to the intended receiving device or service. Examples of receiving devices and services to which such information may be transmitted include but are not necessarily limited to: receivers or map displays in vehicles; receivers or map displays in a data center or other location, a receiving computer or smart phone (may require installation of suitable software application); a cloud based server; a data center; a control center; an in-vehicle information service (e.g., General Motors OnSTar™ System or HERE Technologies System) and/or a traffic and/or road condition monitoring service (e.g., WAZE or Smartway). Further details regarding direct or indirect data transmission of information from the illumination device 12 to receiving device(s) and/or service(s) are described in United States Patent Application Publication No. 2001/0237777 entitled Devices and Methods for Channelizing Vehicular Traffic and Enhancing Workzone Safety, which is expressly incorporated herein by reference, and actually incorporated herein by attachment hereto as Appendix A.

In some embodiments, the traffic cone or other traffic channelizing/marking device may comprise a typical traffic barrel, or channelizer drum such as, for example, an orange or brightly colored barrel having a hollow interior, a vertical or slightly tapered or stepped side wall (at least a portion of which is translucent) and a flange or other projection extending outwardly at the bottom end of the barrel. Commercially available examples of such traffic barrels or channelizer drums include but are not limited to the Commander™ Traffic Drum (Plasticade, Des Plaines, Illinois), The Director™ Traffic Safety Drum (Lakeside Plastics, Oshkosh, Wisconsin) and TrafFix Channelizer Drum™ (Trafix Devices, San Clemente, California). The illuminating devices described herein may be modified in size and configuration as needed for attachment to a traffic barrel, and the brightness, location, and number of LEDs or other emitters and the associated support structures on which they are positioned may be modified to internally illuminate the barrel of drum so that light (visible and/or infrared) or other energy is emitted through the wall of the barrel or drum and is visible to or detectable by oncoming pedestrians or vehicles. In barrels or drums that have near-vertical walls, light transmitted across to the contralateral side may be utilized. In some embodiments, the illuminating device as disclosed herein may be combined with or integrated in a typically rubber or plastic circular ring that rests on a flange or projection at the bottom of the barrel to weigh the barrel down and prevent movement from truck/car wake or wind would be used to mount a circuit board and batteries and LEDs. The electronics and radio transceiver could be separate and mounted inside the barrel for weather protection. Barrels equipped with internal illumination may also incorporate other sensors and components as disclosed herein and in the documents incorporated by reference to provide, for example, location (GNSS/GPS), accelerometers or other vibration sensors to register and report movement, impact, or roll-over, ambient light sensors, radio communication for direct channelizer-to-vehicle, channelizer-to-cloud, channelizer-to-external-modem to cloud, communication. Communication could follow the smart work zone protocol (WZDx—Work Zone Data Exchange).

Although the description set forth hereabove refers to certain non-limiting examples or embodiments of the, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. So, for example, any component, circuitry or functionality of the first embodiment 14 may be included in the second embodiment 101 where feasible, and vice versa. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion, unless otherwise noted. All reasonable additions, deletions, modifications and alterations are to be considered equivalents of the described examples and embodiments and are to be included within the scope of the following claims.

What is claimed is:

1. A system comprising a plurality of illuminating devices for attachment to and internal illumination of stackable traffic channelizing/marking devices which comprise cones, barrels, tubes, drums, buoys or signs, each having a body and a base flange, said body comprising a hollow inner space and a round, conical or frusto-conical side wall that is fully or partially translucent, said base flange extending outwardly about a perimeter of an open bottom end of the body, wherein:

each of said illumination devices is configured for attachment to the base flange of one of the traffic channelizing/marking devices, and comprises;

a plurality of light emitters positioned to cast light onto an inner surface of the fully or partially translucent side wall such that at least some of said light will pass though the fully or partially translucent side wall;

a rechargeable power source;

charging circuitry for recharging the rechargeable power source;

at least one top electrode positioned on a top portion of the illumination device that resides over top of the base flange of the traffic channelizing/marking device to which it is attached;

at least one bottom electrode positioned on a bottom portion of the illumination device that resides beneath the base flange of the traffic channelizing/marking device to which it is attached;

radiofrequency transmitter and radiofrequency receiver configured for radiofrequency communication with one or more other devices; and electronic circuitry configured for powering and controlling the light emitters; and, wherein attachment of each of said illumination devices to one of said stackable traffic channelizing/marking devices forms a plurality of a stackable units, each of said stackable units comprising a traffic channelizing/marking device with the illumination device attached thereto, such that:

each stackable unit can sit, bottom side down, on an underlying road surface during use and, thereafter, can be lifted and removed from the road surface while the illumination device remains attached to the traffic channelizing/marking device; and the stackable units are stackable one upon another with the bottom electrodes of each stackable unit engaging the top electrodes of any stackable unit positioned therebelow, said engagement of top and bottom electrodes providing interconnection of the charging circuitry of all illumination devices in the stack such that connection of a power source to the charging circuitry of a single illumination device in the stack can distribute electrical power to the charging circuitry of all illumination devices in the stack.

2. A system according to claim 1 wherein the light emitters are located on one or more projections which extend upwardly into the hollow inner space of the traffic channelizing/marking device when the illumination device remains attached to the traffic channelizing/marking device in said operative position.

3. A system according to claim 2 wherein said one or more projections function as guides or locators to facilitate positioning of the illumination device in said operative position as it is attached to the traffic channelizing/marking device.

4. A system according to claim 2 wherein said one or more projections extend into the hollow inner space such that the light emitters are positioned adjacent to or in abutting contact with said inner surface of the fully or partially translucent wall.

5. A system according to claim 4 wherein said one or more projections are slanted or curved inwardly for ease of insertion into the hollow inner space.

6. A system according to claim 4 wherein said one or more projections comprises raised ridges having said light emitters and related light emitter circuitry mounted thereon.

7. A system according to claim 1 configured for attachment to a type of traffic channelizing/marking device that has downwardly extending foot members, wherein the base member of the illumination device has one or more passages, openings or cut outs through which the downwardly extending foot members to extend so that the foot members will contact an underlying road surface on which the device is placed.

8. A system according to claim 1 wherein each illumination device further comprises a geolocator selected from: a Global Positioning System (GPS), a Global Navigation Satellite System (GNSS), or other geolocating system which receives and utilizes signals from satellites to determine geolocation.

9. A system according to claim 8 wherein each illumination device further comprises a location transmitter for transmitting the location of the device directly, or indirectly via a gateway or intermediary device, to a receiving location selected from:

a receiver in a vehicle;
a map display in a vehicle;
a remote computer;
a remote map display,
a cloud-based server,
a data center,
a control center,
an in-vehicle information service,
a traffic monitoring service.

10. A system according to claim 1 wherein each illumination device further comprises a sensor for sensing one or more of the following events:

a change in the operational status or operational mode of the illumination device,
movement or tipping over of the illumination device,
impact on the illumination device,
failure of the illumination device, or
movement of a vehicle over top of or past the illumination device.

11. A system according to claim 10 wherein each illumination device further comprises an information transmitter for transmitting information sensed by the sensor directly, or indirectly via a gateway or intermediary device, to a receiving location selected from:

a receiver in a vehicle;
a map display in a vehicle;
a remote computer;
a remote map display,
a cloud based server,
a data center,
a control center,
an in-vehicle information service,
a traffic monitoring service.

12. A system according to claim 1 wherein the stacking electrodes automatically configure proper polarity, and engage one another so as to interconnect the rechargeable power sources of all illumination devices in the stack.

13. A system according to claim 1 further comprising an electrical power connector useable for connecting the charging circuitry of one of the illumination devices while the stackable units are stacked, to thereby deliver electrical power to the charging circuitry of all illumination devices in the stack.

14. A system according to claim 13, wherein the electrical power connector comprises a charging cap.

15. A system according to claim 13 wherein the electrical power connector comprises an electrical cord.

16. A system according to claim 1 wherein light emitters are positioned at light emitter locations adjacent to said side wall and configured to cast light across the hollow inner space and onto the inner surface of the side wall in areas contralateral to or across from the light emitter locations.

17. A system comprising a plurality of illuminating devices for attachment to and internal illumination of stackable traffic channelizing/marking devices which comprise cones, barrels, tubes, drums, buoys or signs, each having a hollow inner space and a side wall that is fully or partially translucent, wherein:

each of said illumination devices comprises;
a base member;
a plurality of light emitters positioned on the base so as to cast light onto an inner surface of the fully or partially translucent side wall such that at least some of said light will pass though the fully or partially translucent wall;
a rechargeable power source;
charging circuitry for recharging the rechargeable power source;
at least one stacking electrode;
radiofrequency transmitter and radiofrequency receiver configured for radiofrequency communication with one or more other devices; and
electronic circuitry configured for powering and controlling the light emitters; and,
wherein each of said illumination devices is configured for attachment to one of said stackable traffic channelizing/marking devices to form a stackable unit comprising the traffic channelizing/marking device with the illumination device attached thereto, such that:
the light emitters will cast light upwardly onto an inner surface of the fully or partially translucent wall so that at least some of that light will pass through the fully or partially translucent wall;
each stackable unit can sit, bottom side down, on an underlying road surface during use and, thereafter, can be lifted and removed from the road surface while the illumination device remains attached to the traffic channelizing/marking device; and
the stackable units are stackable one upon another with the stacking electrodes engaging one another, said engagement of the stacking electrodes providing interconnection of the charging circuitry of all illumination devices in the stack such that connection of a power source to the charging circuitry of a single illumination device in the stack can distribute electrical power to the charging circuitry of all illumination devices in the stack;
wherein the stacking electrodes are situated such that rotation of any illumination device in the stack by 90 degrees will allow continued interconnection of the charging circuitry of all illumination devices in the stack such that connection of a power source to the charging circuitry of a single illumination device in the stack will distribute electrical power to the charging circuitry of all illumination devices in the stack.

18. A system according to claim 17 wherein the light emitters are positioned at light emitter locations adjacent to said side wall and configured to cast light across the hollow inner space and onto the inner surface of the sidewall in areas contralateral to or across from the light emitter locations.

* * * * *